(12) United States Patent
Irie et al.

(10) Patent No.: US 7,676,792 B2
(45) Date of Patent: Mar. 9, 2010

(54) SOFTWARE COMPONENT LIBRARY MANAGEMENT SYSTEM

(75) Inventors: Yutaka Irie, Yokohama (JP); Seiichiro Tanaka, Koshigaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1174 days.

(21) Appl. No.: 11/254,669

(22) Filed: Oct. 21, 2005

(65) Prior Publication Data
US 2006/0037001 A1  Feb. 16, 2006

Related U.S. Application Data

(63) Continuation of application No. 10/097,960, filed on Mar. 15, 2002, now abandoned.

(30) Foreign Application Priority Data

Mar. 15, 2001 (JP) .............................. 2001-073957

(51) Int. Cl.
G06F 9/44 (2006.01)
(52) U.S. Cl. ....................... 717/121; 717/170
(58) Field of Classification Search .......... 717/121–123
See application file for complete search history.

(56) References Cited

U.S. PATENT DOCUMENTS

| | | | |
|---|---|---|---|
| 4,558,413 A | 12/1985 | Schmidt et al. | |
| 4,809,170 A | 2/1989 | Leblang et al. | |
| 5,553,290 A | 9/1996 | Calvert et al. | |
| 5,574,898 A | 11/1996 | Leblang et al. | |
| 5,758,154 A | 5/1998 | Qureshi | |
| 6,061,721 A | 5/2000 | Ismael et al. | |
| 6,085,036 A | 7/2000 | Bandat | |
| 6,598,224 B1 | 7/2003 | Maeda et al. | |
| 2002/0194578 A1* | 12/2002 | Irie et al. ................. | 717/122 |

FOREIGN PATENT DOCUMENTS

JP  10-63495  3/1998

OTHER PUBLICATIONS

Paul Robichaux, "Managing the Windows 2000 Registry"; O'Reilly, 2000, Chapters 1, 2, 4, 5, 9, and 11-11.7. [Retrieved from URL:] <http://proquest.safaribooksonline.com/1565929438>.

(Continued)

Primary Examiner—James Rutten
(74) Attorney, Agent, or Firm—Oblon, Spivak, McClelland, Maier & Neustadt, L.L.P.

(57) ABSTRACT

A software component library management system is provided, which can effectively support both a component utilization user and a component management user in carrying out their business tasks. The component management tool 6 includes a component retrieve/pickup function unit 10 and a component administration/registration function unit 20. The component administration/registration function unit 20 is adapted to make registrations of attribute information on software components stored in the component database 5, such as relation information items representing relations between the software component and other software components. The component retrieve/pickup function unit 10 can retrieve and pickup a batch of software components related to a specific software component, based on the relation information items. The relation information item includes a slave link used to identify a slave component which a certain software component uses (slave information item), and a master link used to identify a master component by which a certain software component is used (master information item).

14 Claims, 45 Drawing Sheets

OTHER PUBLICATIONS

Paul McFedries, "Windows 98 Unleashed"; Sams Publishing, 1998, Chapters 2, 11, 12, and 18. [Retrieved URL:] <http://www.proquest.safaribooksonline.com/0672312352>.

Susan Dart, "Configuration Management: The Missing Link in Web Engineering"; Artech House, 2000, pp. 124-134.

* cited by examiner

FIG. 11

| COMPO-NENT ID | VERSION ID | COMPONENT NAME | FEATURES OF THE VERSION | REGIST-RANT | CORRECTION | RELATING | UPDATE | DELETE |
|---|---|---|---|---|---|---|---|---|
| | | | | | CORRECT | RELATE | UPDATE | DELETE |
| | | | | | CORRECT | RELATE | UPDATE | DELETE |
| | | | | | CORRECT | RELATE | UPDATE | DELETE |
| | | | | | CORRECT | RELATE | UPDATE | DELETE |
| | | | | | CORRECT | RELATE | UPDATE | DELETE |
| | | | | | CORRECT | RELATE | UPDATE | DELETE |
| | | | | | CORRECT | RELATE | UPDATE | DELETE |
| | | | | | | RELATE | UPDATE | DELETE |
| | | | | | | | | DELETE |

FIG. 18

Unregistered Master Component List (97) window showing columns: COMPONENT ID, VERSION ID, COMPONENT NAME, FEATURES OF THE VERSION, REGISTRANT, CORRECTION (with CORRECT buttons labeled 98).

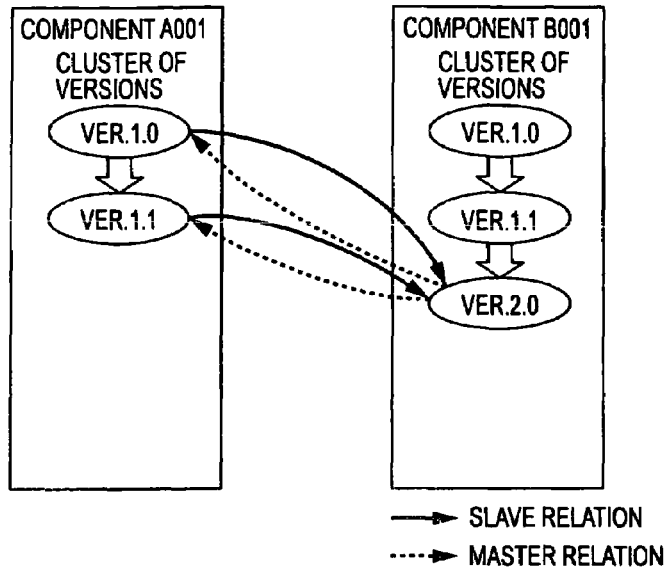

FIG. 19

| COMPONENT ID | VERSION ID | COMPONENT NAME | FEATURES OF THE VERSION | REGISTRANT | OTHERS |
|---|---|---|---|---|---|
| A001 | -1 | APPLICATION COMPONENT A | (CLUSTER OF VERSIONS) | N.N. | .... |
| A001 | 1.0 | APPLICATION COMPONENT A | INITIAL VERSION | N.N. | .... |
| A001 | 1.1 | APPLICATION COMPONENT A | NEW OS COMPATIBLE | N.N. | .... |
| B001 | -1 | BASIC COMPONENT B | (CLUSTER OF VERSIONS) | A.K. | .... |
| B001 | 1.0 | BASIC COMPONENT B | INITIAL VERSION | A.K. | .... |
| B001 | 1.1 | BASIC COMPONENT B | PROBLEMS IN OLD VERSIONS WERE SOLVED | A.K. | .... |
| B001 | 2.0 | BASIC COMPONENT B | SUITABLE FOR ACCELERATED PROCESSING | A.K. | .... |
|  |  |  |  |  |  |

FIG. 20

| SLAVE LINK START POINT | | SLAVE LINK DESTINATION | |
|---|---|---|---|
| COMPONENT ID | VERSION ID | COMPONENT ID | VERSION ID |
| A001 | 1.0 | B001 | 2.0 |
| A001 | 1.1 | B001 | 2.0 |

FIG. 21

| MASTER LINK START POINT | | MASTER LINK DESTINATION | |
|---|---|---|---|
| COMPONENT ID | VERSION ID | COMPONENT ID | VERSION ID |
| B001 | 2.0 | A001 | 1.0 |
| B001 | 2.0 | A001 | 1.1 |

→ SLAVE RELATION
┈▶ MASTER RELATION

| COMPONENT ID | VERSION ID | COMPONENT NAME | FEATURES OF THE VERSION | REGISTRANT | OTHERS |
|---|---|---|---|---|---|
| A001 | -1 | APPLICATION COMPONENT A | (CLUSTER OF VERSIONS) | N.N. | .... |
| A001 | 1.0 | APPLICATION COMPONENT A | INITIAL VERSION | N.N. | .... |
| A001 | 1.1 | APPLICATION COMPONENT A | NEW OS COMPATIBLE | N.N. | .... |
| B001 | -1 | BASIC COMPONENT B | (CLUSTER OF VERSIONS) | A.K. | .... |
| B001 | 1.0 | BASIC COMPONENT B | INITIAL VERSION | A.K. | .... |
| B001 | 1.1 | BASIC COMPONENT B | PROBLEMS IN OLD VERSIONS WERE SOLVED | A.K. | .... |
| B001 | 2.0 | BASIC COMPONENT B | SUITABLE FOR ACCELERATED PROCESSING | A.K. | .... |
| C001 | -1 | APPLICATION COMPONENT C | (CLUSTER OF VERSIONS) | K.M. | .... |
| C001 | 1.0 | APPLICATION COMPONENT C | INITIAL VERSION | K.M. | .... |
| | | | | | |

FIG. 25

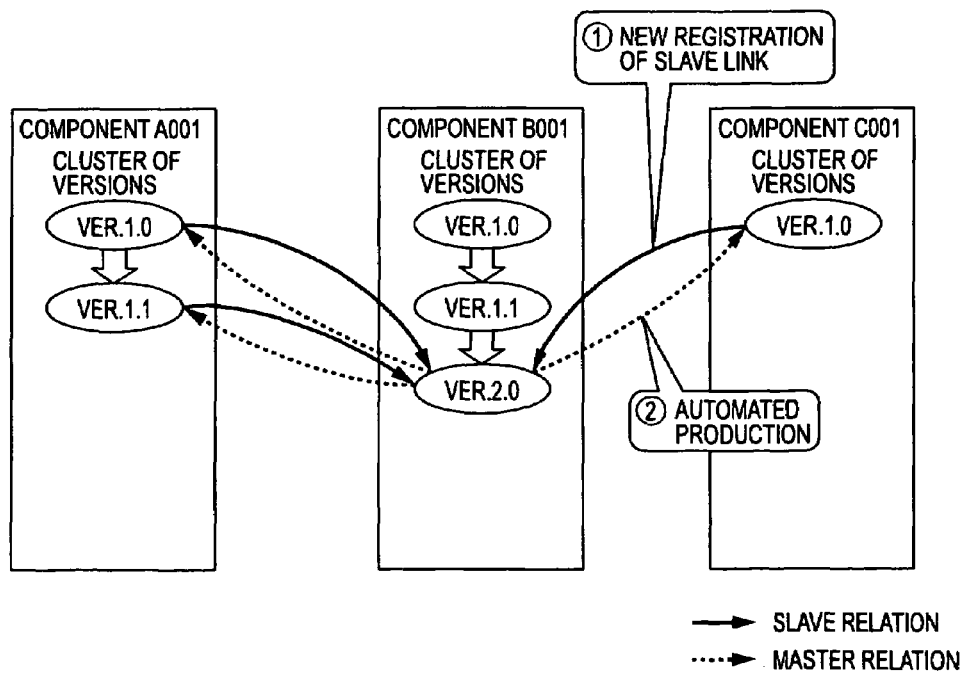

FIG. 26

| SLAVE LINK START POINT | | SLAVE LINK DESTINATION | |
|---|---|---|---|
| COMPONENT ID | VERSION ID | COMPONENT ID | VERSION ID |
| A001 | 1.0 | B001 | 2.0 |
| A001 | 1.1 | B001 | 2.0 |
| C001 | 1.0 | B001 | 2.0 |

| MASTER LINK START POINT | | MASTER LINK DESTINATION | |
|---|---|---|---|
| COMPONENT ID | VERSION ID | COMPONENT ID | VERSION ID |
| B001 | 2.0 | A001 | 1.0 |
| B001 | 2.0 | A001 | 1.1 |
| B001 | 2.0 | C001 | 1.0 |

| COMPONENT ID | VERSION ID | COMPONENT NAME | FEATURES OF THE VERSION | REGISTRANT | OTHERS |
|---|---|---|---|---|---|
| A001 | -1 | APPLICATION COMPONENT A | (CLUSTER OF VERSIONS) | N.N. | .... |
| A001 | 1.0 | APPLICATION COMPONENT A | INITIAL VERSION | N.N. | .... |
| A001 | 1.1 | APPLICATION COMPONENT A | NEW OS COMPATIBLE | N.N. | .... |
| A001 | 2.0 | APPLICATION COMPONENT A | IMPROVEMENT | N.N. | .... |
| B001 | -1 | BASIC COMPONENT B | (CLUSTER OF VERSIONS) | A.K. | .... |
| B001 | 1.0 | BASIC COMPONENT B | INITIAL VERSION | A.K. | .... |
| B001 | 1.1 | BASIC COMPONENT B | PROBLEMS IN OLD VERSIONS WERE SOLVED | A.K. | .... |
| B001 | 2.0 | BASIC COMPONENT B | SUITABLE FOR ACCELERATED PROCESSING | A.K. | .... |
| C001 | -1 | APPLICATION COMPONENT C | (CLUSTER OF VERSIONS) | K.M. | .... |
| C001 | 1.0 | APPLICATION COMPONENT C | INITIAL VERSION | K.M. | .... |
|  |  |  |  |  |  |

FIG. 37

| SLAVE LINK START POINT | | SLAVE LINK DESTINATION | |
|---|---|---|---|
| COMPONENT ID | VERSION ID | COMPONENT ID | VERSION ID |
| A001 | 1.0 | B001 | 2.0 |
| A001 | 1.1 | B001 | 2.0 |
| C001 | 1.0 | B001 | 2.0 |
| A001 | 2.0 | B001 | -1 |

FIG. 38

| SLAVE LINK START POINT | | SLAVE LINK DESTINATION | |
|---|---|---|---|
| COMPONENT ID | VERSION ID | COMPONENT ID | VERSION ID |
| A001 | 1.0 | B001 | 2.0 |
| A001 | 1.1 | B001 | 2.0 |
| C001 | 1.0 | B001 | 2.0 |
| A001 | 2.0 | B001 | 2.0 |

| MASTER LINK START POINT | | MASTER LINK DESTINATION | |
|---|---|---|---|
| COMPONENT ID | VERSION ID | COMPONENT ID | VERSION ID |
| B001 | 2.0 | A001 | 1.0 |
| B001 | 2.0 | A001 | 1.1 |
| B001 | 2.0 | A001 | 2.0 |
| B001 | 2.0 | C001 | 1.0 |

| COMPONENT ID | VERSION ID | COMPONENT NAME | FEATURES OF THE VERSION | REGISTRANT | OTHERS |
|---|---|---|---|---|---|
| A001 | -1 | APPLICATION COMPONENT A | (CLUSTER OF VERSIONS) | N.N. | .... |
| A001 | 1.0 | APPLICATION COMPONENT A | INITIAL VERSION | N.N. | .... |
| A001 | 1.1 | APPLICATION COMPONENT A | NEW OS COMPATIBLE | N.N. | .... |
| A001 | 2.0 | APPLICATION COMPONENT A | IMPROVEMENT | N.N. | .... |
| B001 | -1 | BASIC COMPONENT B | (CLUSTER OF VERSIONS) | A.K. | .... |
| B001 | 1.0 | BASIC COMPONENT B | INITIAL VERSION | A.K. | .... |
| B001 | 1.1 | BASIC COMPONENT B | PROBLEMS IN OLD VERSIONS WERE SOLVED | A.K. | .... |
| B001 | 2.0 | BASIC COMPONENT B | SUITABLE FOR ACCELERATED PROCESSING | A.K. | .... |
| B001 | 2.1 | BASIC COMPONENT B | DEBUGGED | A.K. | .... |
| C001 | -1 | APPLICATION COMPONENT C | (CLUSTER OF VERSIONS) | K.M. | .... |
| C001 | 1.0 | APPLICATION COMPONENT C | INITIAL VERSION | K.M. | .... |
|  |  |  |  |  |  |

FIG. 45

| MASTER LINK START POINT | | MASTER LINK DESTINATION | |
|---|---|---|---|
| COMPONENT ID | VERSION ID | COMPONENT ID | VERSION ID |
| B001 | 2.0 | A001 | 1.0 |
| B001 | 2.0 | A001 | 1.1 |
| B001 | 2.0 | A001 | 2.0 |
| B001 | 2.0 | C001 | 1.0 |
| B001 | 2.1 | A001 | -1 |
| B001 | 2.1 | C001 | -1 |

FIG. 46

| SLAVE LINK START POINT | | SLAVE LINK DESTINATION | |
|---|---|---|---|
| COMPONENT ID | VERSION ID | COMPONENT ID | VERSION ID |
| A001 | 1.0 | B001 | 2.0 |
| A001 | 1.1 | B001 | 2.0 |
| C001 | 1.0 | B001 | 2.0 |
| A001 | 2.0 | B001 | 2.0 |
| A001 | 2.0 | B001 | 2.1 |

| MASTER LINK START POINT | | MASTER LINK DESTINATION | |
|---|---|---|---|
| COMPONENT ID | VERSION ID | COMPONENT ID | VERSION ID |
| B001 | 2.0 | A001 | 1.0 |
| B001 | 2.0 | A001 | 1.1 |
| B001 | 2.0 | A001 | 2.0 |
| B001 | 2.0 | C001 | 1.0 |
| B001 | 2.1 | A001 | 2.0 |

| COMPONENT ID | VERSION ID | COMPONENT NAME | FEATURES OF THE VERSION | REGISTRANT | OTHERS |
|---|---|---|---|---|---|
| A001 | -1 | APPLICATION COMPONENT A | (CLUSTER OF VERSIONS) | N.N. | .... |
| A001 | 1.0 | APPLICATION COMPONENT A | INITIAL VERSION | N.N. | .... |
| A001 | 1.1 | APPLICATION COMPONENT A | NEW OS COMPATIBLE | N.N. | .... |
| A001 | 2.0 | APPLICATION COMPONENT A | IMPROVEMENT | N.N. | .... |
| B001 | -1 | BASIC COMPONENT B | (CLUSTER OF VERSIONS) | A.K. | .... |
| B001 | 1.0 | BASIC COMPONENT B | INITIAL VERSION | A.K. | .... |
| B001 | 1.1 | BASIC COMPONENT B | PROBLEMS IN OLD VERSIONS WERE SOLVED | A.K. | .... |
| B001 | 2.1 | BASIC COMPONENT B | DEBUGGED | A.K. | .... |
| C001 | -1 | APPLICATION COMPONENT C | (CLUSTER OF VERSIONS) | K.M. | .... |
| C001 | 1.0 | APPLICATION COMPONENT C | INITIAL VERSION | K.M. | .... |
| | | | | | |

FIG. 58

| SLAVE LINK START POINT | | SLAVE LINK DESTINATION | |
|---|---|---|---|
| COMPONENT ID | VERSION ID | COMPONENT ID | VERSION ID |
| A001 | 1.0 | B001 | -1 |
| A001 | 1.1 | B001 | -1 |
| C001 | 1.0 | B001 | -1 |
| A001 | 2.0 | B001 | -1 |
| A001 | 2.0 | B001 | 2.1 |

FIG. 59

| MASTER LINK START POINT | | MASTER LINK DESTINATION | |
|---|---|---|---|
| COMPONENT ID | VERSION ID | COMPONENT ID | VERSION ID |
| B001 | 2.1 | A001 | 2.0 |

FIG. 60

SOFTWARE COMPONENT LIBRARY MANAGEMENT SYSTEM

BACKGROUND OF THE INVENTION

1. Field of the Invention

The present invention relates to a software component library in which a plurality of software components are stored, and more particularly, to a software component library management system used to manage a software component library, a method of the same, and a software component library management program.

2. Description of the Related Art

In the state of the art, a software component library is well known as a system, which is adapted to effectively use a systematic integration of software resources developed by specific business entities. The software component library contains a plurality of software applications that serve as components (referred to as "software component(s)" or simply as "component(s)" hereinafter). The "software component" herein is conceptually not limited to a software application that functions as a "component" to execute a part of process, as the term usually means, but covers a "complete product" that implements the entire process.

Also herein, the software component library is a component database for storage of software components themselves and documents containing their specifications and users' manuals; and a software component library management system is used as a tool to manage the components to provide various services for users who utilize the components and/or manage them.

Specifically, the component utilization user can use the software component library management system to retrieve and pickup required software components from the software component library. The component management user can use the software component library management system for various managements such as registration and deletion of the software components in and from the software component library.

The software components stored in the software component library, even once stored therein, often needs to be updated to cope with malfunctions and varied operation environments. For that purpose, usually, even after a certain software component is updated, the component of the previous version is left in the software component library without change while the component of the renovated version is registered as a new software component.

Many of the software components in the software component library can be used in combination with one another. For instance, if a software component and another software component using the former one exist, there may be a relation that the latter is never used without using the former. Such a relation is especially significant in reusing software in object-oriented programming. For example, a framework and a custom component working on the framework give rise to a relation that the custom component uses the framework. The framework and the custom component are software entities, each of which can be a component of more comprehensive entities. When two of classes (or two of class groups) respectively related to "utilization relationship" and "aggregation relationship" are used as separate components from each other in an unified modeling language (UML) in the field of the object oriented programming, a dependent relation as mentioned above is found.

In this specification, in conjunction with the aforementioned dependent relation, a relation where a certain software component uses others is termed "slave relation" while a software which the certain software component uses is termed "slave component." On the other hand, a reverse relation to the above where a certain software component is used is termed as "master relation" while a software component by which the certain software component is used is termed "master component." These relations (slave and master) are comprehensible if contemplated in a situation where an application software and an operating system are correlated; that is, the application software uses the operating system like a slave while the operating system is supervised by all master application software programs running in upper levels of the system hierarchy. In general, a single software component is related to a plurality of slave components or a plurality of master components.

In the above-mentioned prior art software component library management system, however, since there is no feature of explicitly supporting the relations, i.e., master to slave and vice versa, a component utilization user and a component management user must study a document, such as a specification and a user's manual of an individual software component, and learn additional software components as well, and must still retrieve those additional software components.

Also, in the aforementioned prior art software component library management system, two software components mutually in master to slave relation or vice versa would usually be updated independent of each other; and there arises a problem that it is difficult to learn if operations among varied versions of the software components have been confirmed.

SUMMARY OF THE INVENTION

The present invention is made in the light of overcoming the above-mentioned prior art disadvantages; and accordingly, it is an object of the present invention to provide a software component library management system, a method of the same, and a software component library management program product in which administrations over dependent relations among software components and operation confirmation are explicitly implemented so as to effectively support both a component utilization user in retrieving and picking up a software component(s) and a component management user in managing various operations such as registration and deletion of a software component.

In a first aspect, the present invention provides a software component library management system that manages a software component library having a plurality of software components stored therein. The system comprises: a component management unit that registers a plurality of relation information items respectively representing a relation of a certain software component to another software component, as attribute information of the software components stored in the software component library, the relation information items including a slave information item specifying a slave component which a certain software component uses, and a master information item specifying a master component by which a certain software component is used; and a component providing unit that provides a batch of software components related to a specific software component, based upon the relation information items registered in the component management unit.

In relation with the above first aspect of the present invention, preferably, the component management unit registers a slave information item for a software component stored in the software component library, while automatically creating and registering a master information item corresponding to the slave information item.

Also, in relation with the above first aspect of the present invention, preferably, the component management unit newly registers an updated version of a software component stored in the software component library, while creating and registering a renewed relation information item including sub-information that an operation among software components has not been confirmed yet, based upon a relation information item for a previous version of the software component. Specifically, the component management unit preferably manages a cluster of versions which is comprised of a group of different versions of a software component stored in the software component library; and the component management unit newly registers an updated version of a software component stored in the software component library, while creating and registering a renewed relation information item that represents a relation of the software component to a cluster of versions of a related software component serving as either a slave component or a master component, based upon a relation information item for a previous version of the software component. Also preferably, the component management unit manages a relation information item for a software component stored in the software component library, along with an operation confirmation information item; and the component management unit newly registers an updated version of a software component stored in the software component library, while registering an operation confirmation information item that an operation among software components has not been confirmed yet, along with a relation information item for a previous version of the software component.

Further, in relation with the above-mentioned first aspect of the present invention, the component management unit preferably lists and displays a combination of software components of which mutual operation has not been confirmed yet, based upon the relation information items for the software components stored in the software component library.

In relation with the above-mentioned first aspect, also preferably, the component management unit deletes a specific software component stored in the software component library, while searching for a presence of a master component which uses the specific software component, and giving an alert, if present.

In a second aspect of the present invention, the present invention provides a method of managing a software component library having a plurality of software components stored therein. The method comprises the steps of: registering a plurality of relation information items that respectively represent a relation of a certain software component to another software component, as attribute information of the software components stored in the software component library, the relation information items including a slave information item specifying a slave component which a certain software component uses, and a master information item specifying a master component by which a certain software component is used; and providing a batch of software components related to a specific software component, based upon the registered relation information items.

In a third aspect, the present invention provides a software component library management program product that manages a software component library having a plurality of software components stored therein. The program product makes a computer execute the procedures of: registering a plurality of relation information items that respectively represent a relation of a certain software component to another software component, as attribute information of the software components stored in the software component library, the relation information items including a slave information item specifying a slave component which a certain software component uses, and a master information item specifying a master component by which a certain software component is used; and providing a batch of software components related to a specific software component, based upon the registered relation information items.

According to the present invention, relation information items (slave links and master links), which respectively represent a relation of a software component to another software component, are registered as attribute information of the software components stored in the software component library, and the relation information items thus registered can be used to retrieve and pick up a batch of the software components related to the specific software component. This enables a component utilization user to handle a series of mutually related software components more easily, and this leads to an enhancement of manipulability.

In addition, according to the present invention, when a slave information item is registered in relation with the software components stored in the software component library, a master information item corresponding to the slave information item is automatically created and registered. Therefore, a component management user can reduce his or her time and labor spent for registration entry for updated software components.

Further, according to the present invention, when it is desired to newly register an updated version of a software component stored in the software component library, a renewed relation information item including sub-information that an operation among software components has not been confirmed yet is created and registered based upon a relation information item form a previous version of the software component. This enables a component utilization user and a component management user to comprehend particulars of each version with respect to complete or incomplete confirmation of the operations among the software components, and this leads to a further enhancement of manipulability. Especially, it results in further enhancement of manipulability for the component utilization user and the component management user to list and display a combination of the software components of which correlated operations have not been confirmed yet.

Also additionally, according to the present invention, when it is desired to delete a specific software component from the software component library, the presence of a master component using the specific software component is retrieved and listed on a display (as an alert), based upon a relation information item for the specific software component; and hence, it is effectively prevented that a slave component, which a certain software component uses, is inadvertently deleted.

BRIEF DESCRIPTION OF THE DRAWINGS

FIG. 11 is a diagram showing a component list window (for administration);

FIG. 18 is a diagram showing an unregistered master component list window (master link/non-confirmed operation list window);

FIG. 19 is a diagram illustrating an initial state of managed groups of the software components;

FIG. 20 is a diagram showing a component table of the software component groups in the initial state;

FIG. 21 is a diagram showing a slave link table of the software component groups in the initial state;

FIG. 25 is a diagram showing a component table of the software component (Ver. 1.0 of the component C001) upon a new registration;

FIG. 26 is a diagram illustrating a manner of newly registering (editing) a slave link of the software component (Ver. 1.0 of the component C001);

FIG. 37 is a diagram showing a component table upon updating and registering the software component (component A001);

FIG. 38 is a diagram showing a slave link table upon updating and registering the software component (component A001);

FIG. 45 is a diagram showing a component table upon updating and registering the software component (component B001);

FIG. 46 is a diagram showing a master link table upon updating and registering the software component (component B001);

FIG. 58 is a diagram showing a component table upon deleting the software component (Ver. 2.0 of the component B001);

FIG. 59 is a diagram showing a slave link table upon deleting the software component (Ver. 2.0 of the component B001); and FIG. 60 is a diagram showing a master link table upon deleting the software component (Ver. 2.0 of the component B001).

DETAILED DESCRIPTION OF THE PREFERRED EMBODIMENTS

Figure 1:
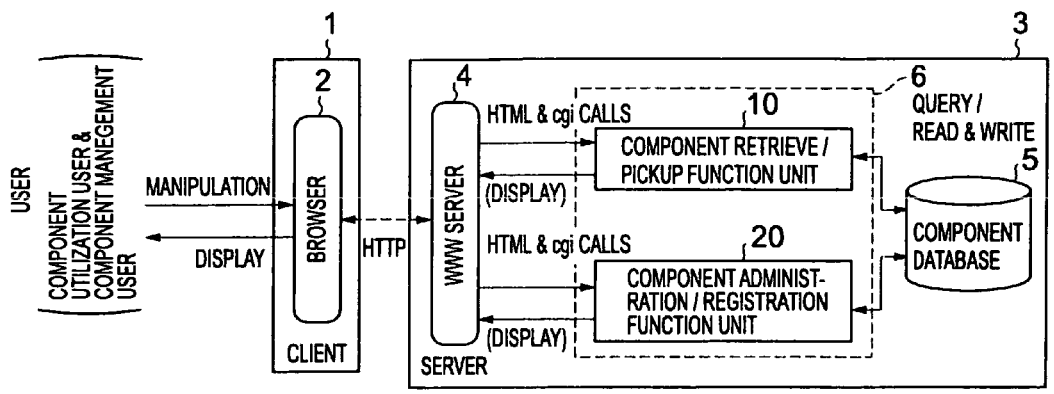
FIG. 1 is a block diagram showing an embodiment of a software component library management system according to the present invention.

Preferred embodiments of the present invention will be described in detail in conjunction with the accompanying drawings. FIGS. 1 to 60 are diagrams illustrating a best mode of a software component library management system according to the present invention.

First, with reference to FIG. 1, the entire architecture of a computer system of a preferred embodiment according to the present invention will be explained.

As shown in FIG. 1, the computer system of the embodiment is comprised of a client computer 1 and a server computer 3 which are mutually connected via a network such as Internet.

The client computer 1 is installed with WWW (World Wide Web) browser 2 providing a user interface for a component utilization user and a component management user, and it gives operation windows on a display which receive input of instructions and data in response to manipulations of a mouse or other elements related to the windows.

The server computer 3 is installed with a WWW server 4 interacting with the WWW browser 2 on the client computer 1 by means of communication protocols such as HTTP (Hypertext Transfer Protocol), and a component database (software component library) 5 having a plurality of software components stored therein, and the server computer 3 uses a component management tool (software component library) 6 to respond to instructions from the WWW server 4 to administer the component database 5. The instruction transfer from the WWW server 4 to the component management tool 6 is carried out by calling HTML (Hypertext Makeup Language), cgi (Common Gateway Interface), and the like, and realizations of the results include varying the operation windows on the client computer 1 and writing in the component database 5.

The component management tool 6 comprises a component retrieve/pickup function unit 10 retrieving and providing software components from the component database 5, and a component administration/registration function unit 20 for various managements such as registration and deletion of software components in and from the component database 5.

The component administration/registration function unit 20 is capable of making registrations of attribute information on software components stored in the component database 5, such as registration data of the software component (component ID, version ID, component name, features of the version, registrant, etc.) and relation data representing relations between the software component and other software components. The component retrieve/pickup function unit 10 can treat a batch of additional software components related to the specific software component, based on the relation information registered through the component administration/registration function unit 20, so as to retrieve and/or pick up the batch. The relation information includes slave links used to identify components with those which a certain software component uses (slave information), and master links used to identify components with those by which a certain software component is used (master information).

The component database 5 includes a component table (see FIG. 20) in which the software components themselves and the registration information (component ID, version ID, component name, features of the version, registrant, etc.) are stored, a slave link table (see FIG. 21) retaining slave links among the software components, and a master link table (see FIG. 22) retaining slave links among the software components.

The component retrieve/pickup function unit 10 and the component administration/registration function unit 20 of the component management tool 6 will be detailed below in relation with the operation windows displayed on the client computer 1.

Figure 4:
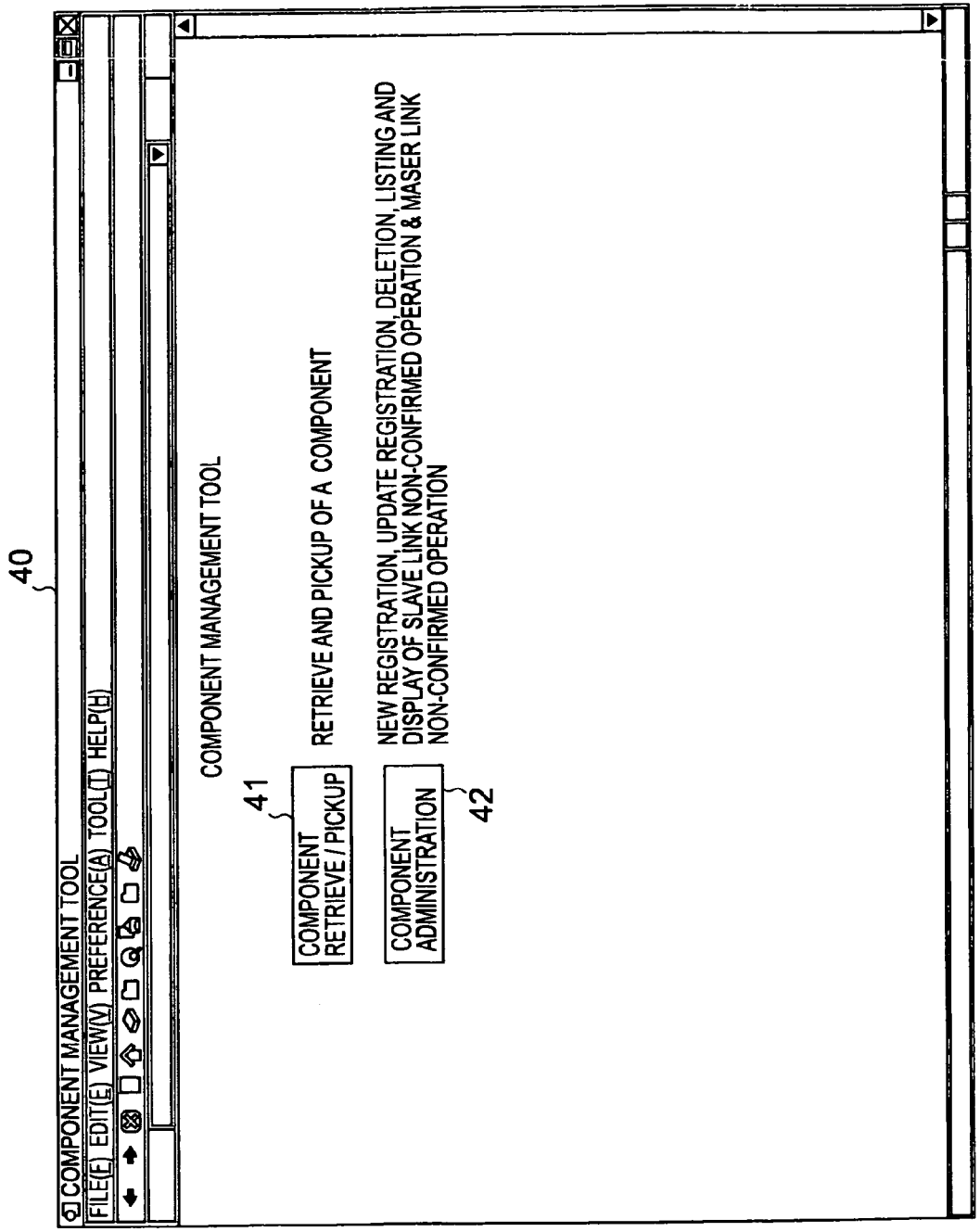
FIG. 4 is a diagram showing a main menu window upon system start.
Figure 5:
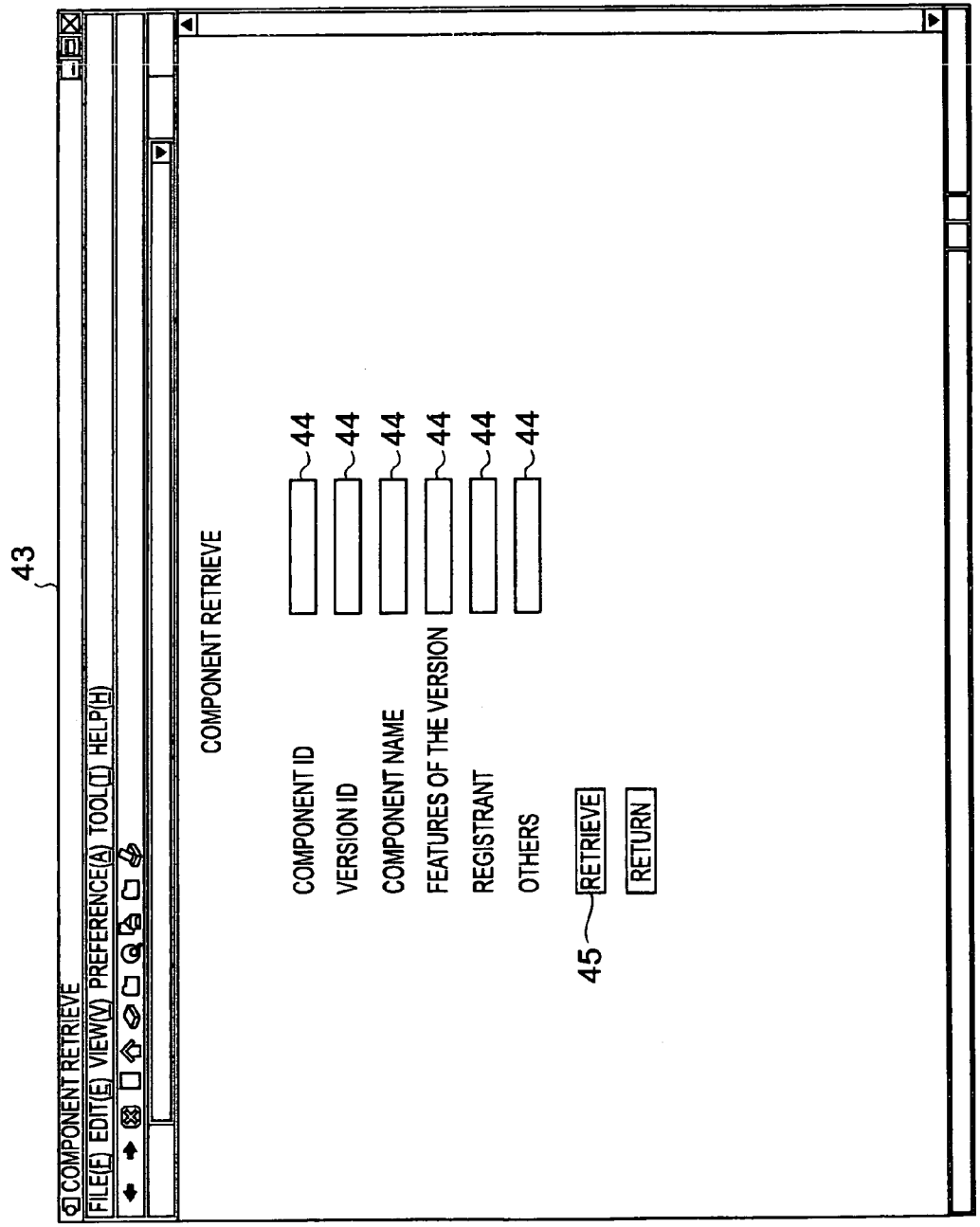
FIG. 5 is a diagram showing a component retrieve window (for component pickup)
Figure 8:
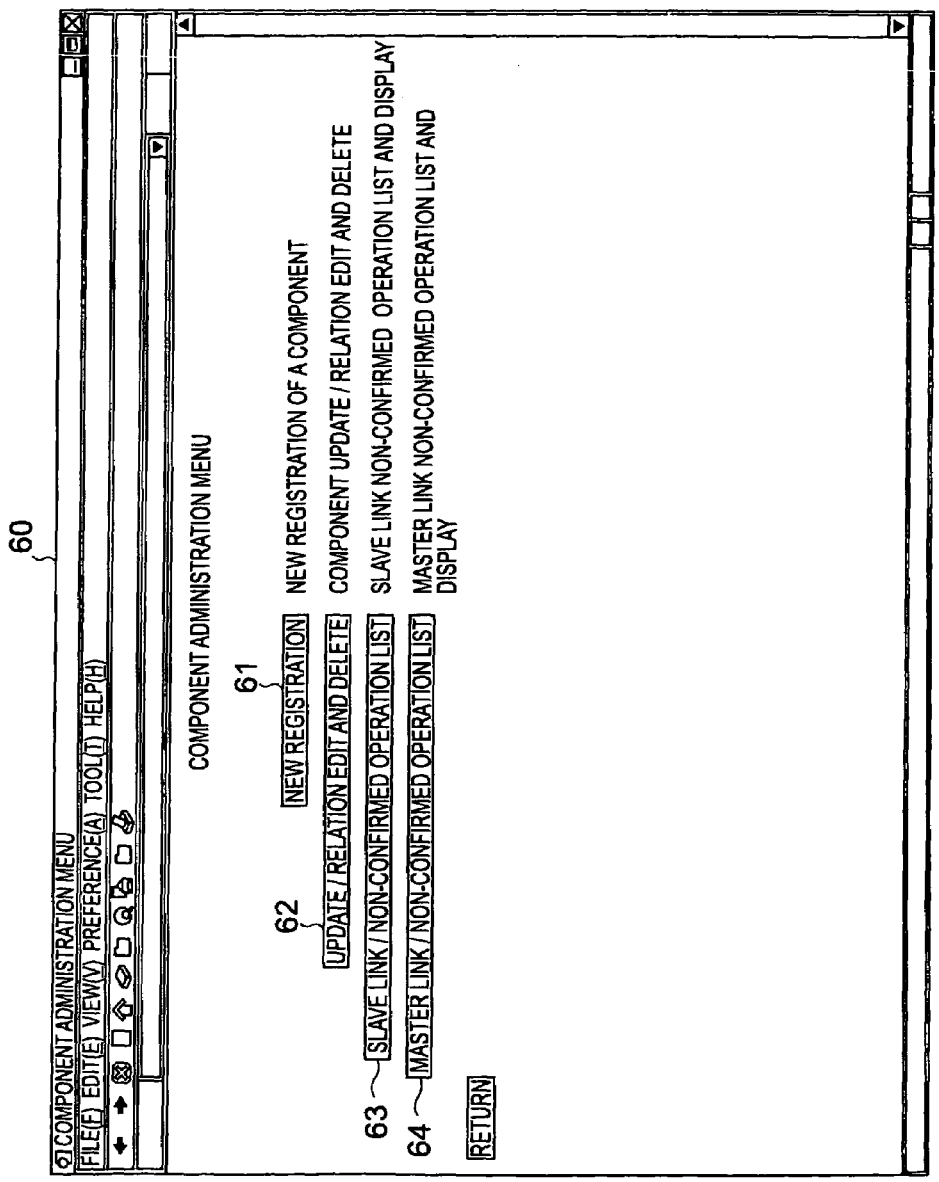
FIG. 8 is a diagram showing a component administration menu window.

The operation window on a display is given like a main menu window 40 as shown in FIG. 4 upon starting the component management tool 6, and in the main menu window 40, a "component retrieve/pickup" button 41 is selected to display a component retrieve window (for component pickup) as in FIG. 5 while a "component administration" button 42 is selected to display a component administration menu window 60 as in FIG. 8.

Component Retrieve/Pickup Function Unit 10

Figure 2:
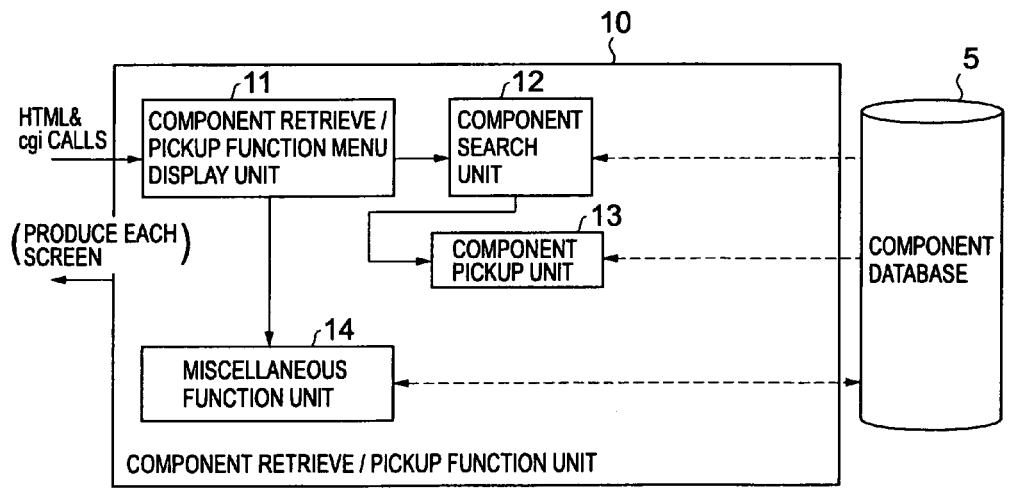
FIG. 2 is a block diagram showing details of a component retrieve/pickup function unit of the software component library management system of FIG. 1.
Figure 6:
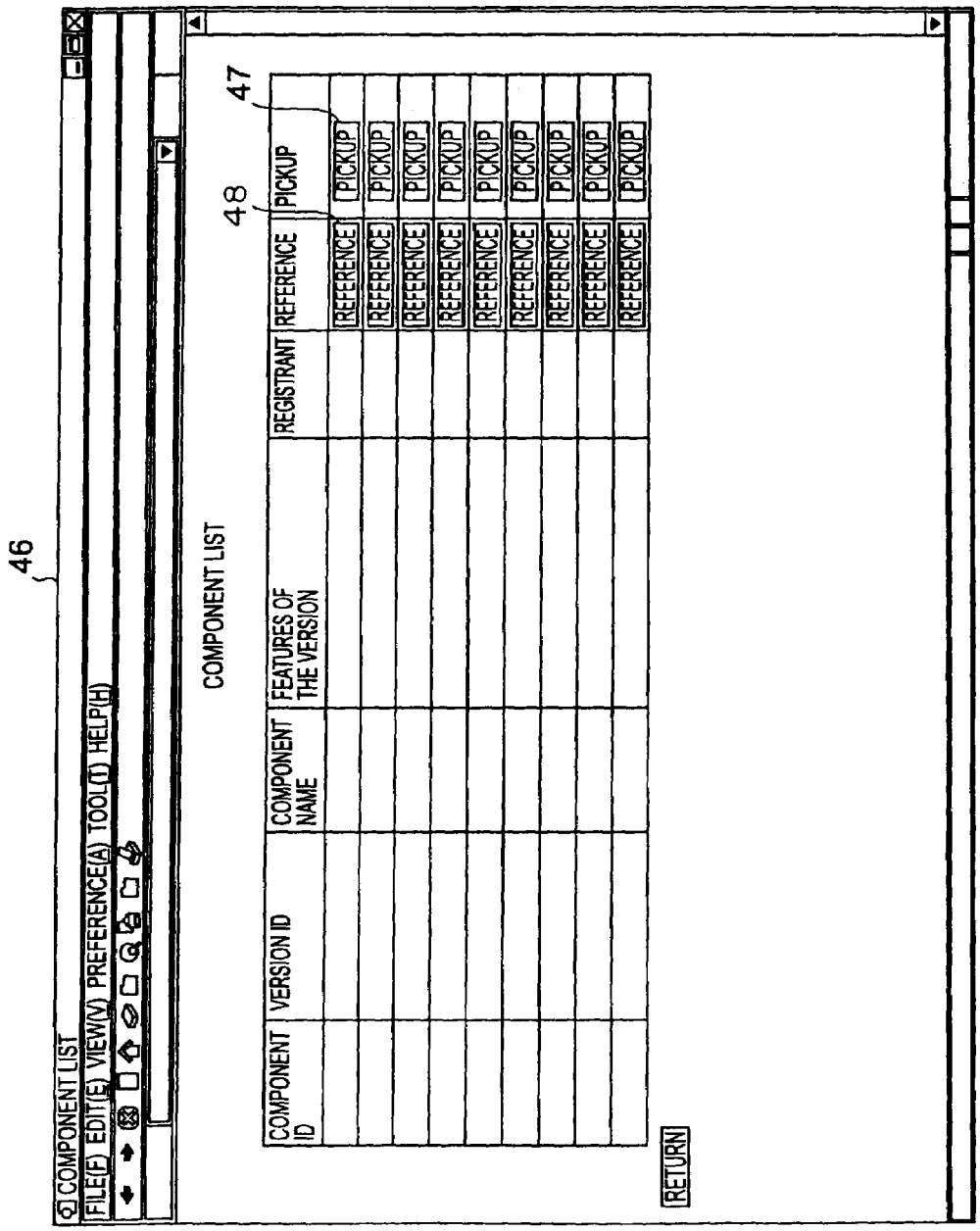
FIG. 6 is a diagram showing a component list window (for component pickup)
Figure 7:
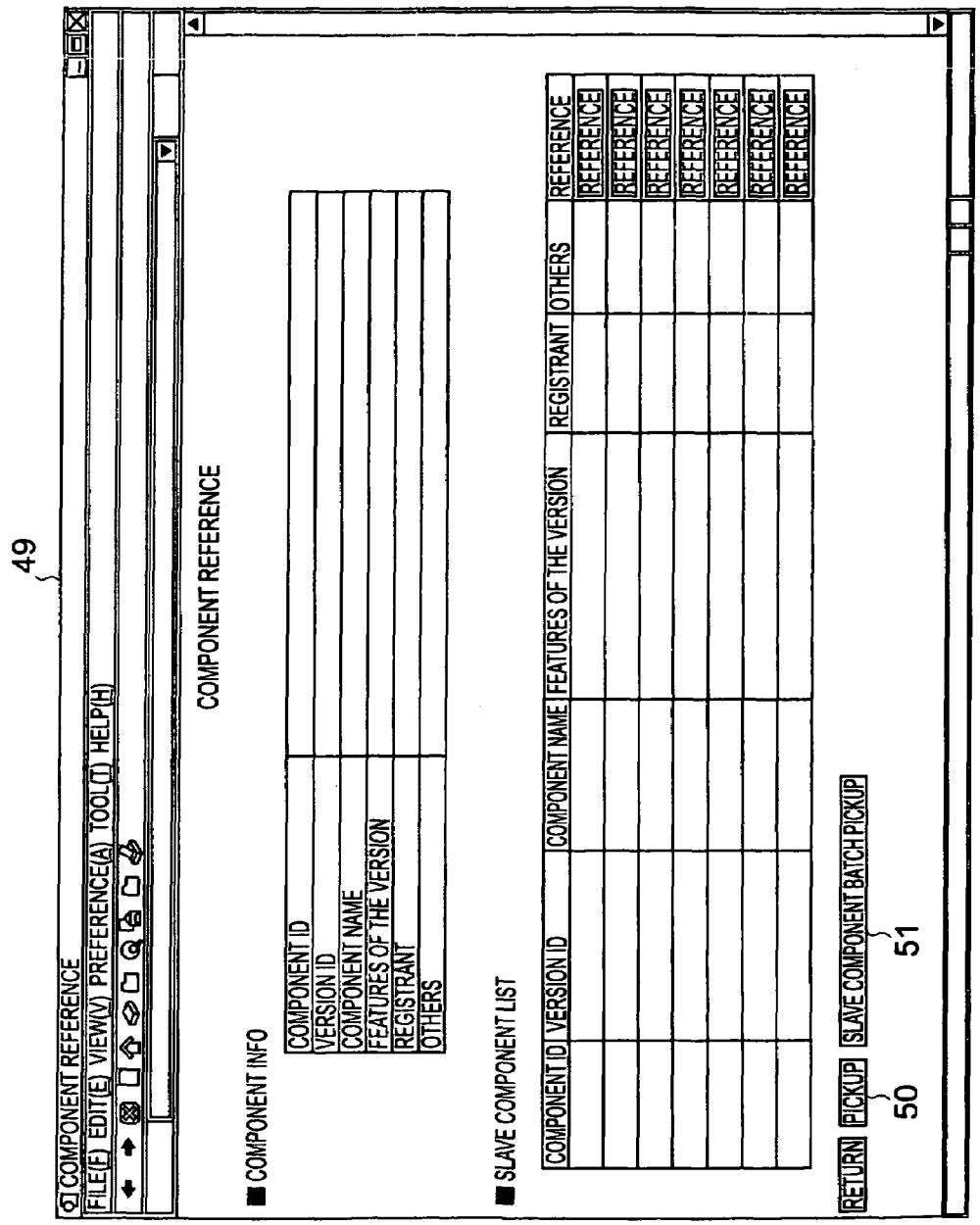
FIG. 7 is a diagram showing a component reference window (for component pickup)

Referring to FIG. 2 and FIGS. 5 to 7, the component retrieve/pickup function unit 10 will now be described in detail. FIG. 2 is a block diagram illustrating details of the component retrieve/pickup function unit 10 while FIGS. 5 to 7 are diagrams showing operation windows produced by the component retrieve/pickup function unit 10. In FIG. 2, an arrow of solid line denotes a control flow (calling), and an arrow of broken line represents reading and writing from and to the component database 5.

As shown in FIG. 2, the component retrieve/pickup function unit 10 has a component retrieve/pickup functional menu display unit 11 that displays operation windows of retrieving and/or picking up software components for a component utilization user. The component retrieving/pickup functional menu display unit 11 gives a component retrieve window 43 (for component pickup) as in FIG. 5.

In the component retrieve window 43 shown in FIG. 5, after fields 44 are filled with conditions for retrieving a desired software component (i.e., component ID, version ID, component name, features of the version, registrant, etc), respectively, a "retrieve" button 45 is selected to evoke a component search unit 12 (see FIG. 2) through the component retrieve/pickup functional menu display unit 11, and as a consequence, a retrieval from the component database 5 is carried out for a software component(s) meeting the entered conditions. The software component(s) fetched by the component search unit 12 is listed on a search result window as shown in FIG. 6.

In the search result window 46 (for component pickup) as in FIG. 6, a "pickup" button 47 for a desired software component is selected to evoke a pickup unit 13 (see FIG. 2) through the component search unit 12, and as a result, a pickup from the component database 5 is carried out to load the software component. Additionally, selecting a "reference" button 48 causes a display of a component reference window 49 (for component pickup) shown in FIG. 7 for the software component to permit a slave link(s) for the software component to be monitored.

In the component reference window 49 as in FIG. 7, a "pickup" button 50 is selected to load the software component from the component database 5. Selecting a "slave component batch pickup" button 51 causes a batch of the software component and its slave component(s) to be loaded from the component database 5.

As shown in FIG. 2, the component retrieve/pickup function unit 10 has a miscellaneous function unit 14 which is evoked by the component retrieve/pickup function menu display unit 11 to execute additional processes in relation with the retrieval and/or pickup of the software component(s).

Component Administration/Registration Function Unit 20

Figure 3:
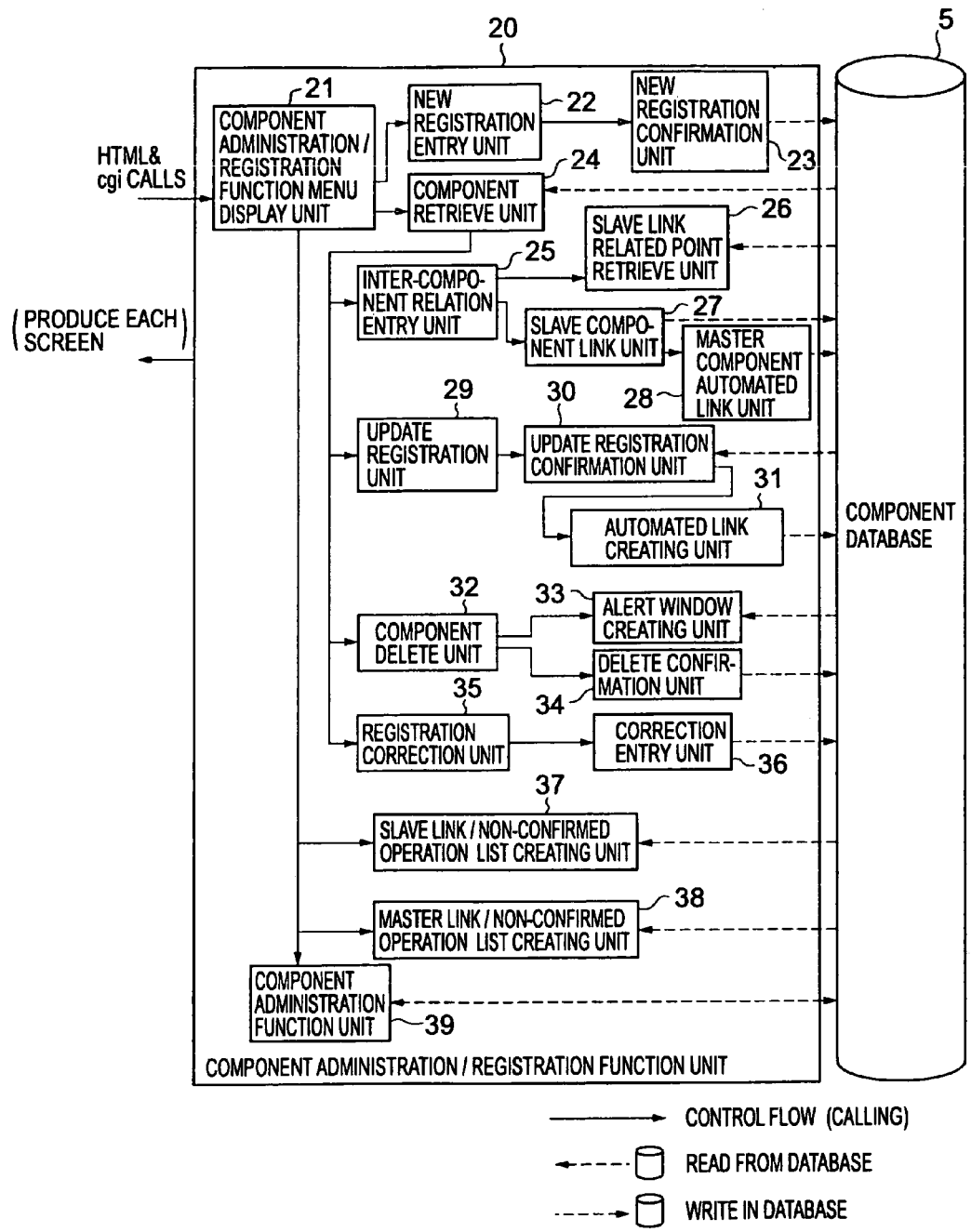
FIG. 3 is a block diagram showing details of a component administration/registration function unit of the software component library management system of FIG. 1.

Referring to FIG. 3 and FIGS. 8 to 18, a component administration/registration function unit 20 will now be detailed. FIG. 3 is a block diagram showing particulars of the component administration/registration function unit 20 while FIGS. 8 to 18 are diagrams showing operation windows produced by the component administration/registration function unit 20. In FIG. 3, an arrow of solid line denotes a control flow (calling), and an arrow of broken line denotes reading and writing from and in the component database 5.

As shown in FIG. 3, the component administration/registration function unit 20 includes a component administration/registration function menu display unit 21 which presents operation windows of a management over software components for a component management user. The component administration/registration function menu display unit 21 produces a component administration menu window 60 as shown in FIG. 8.

Figure 9:
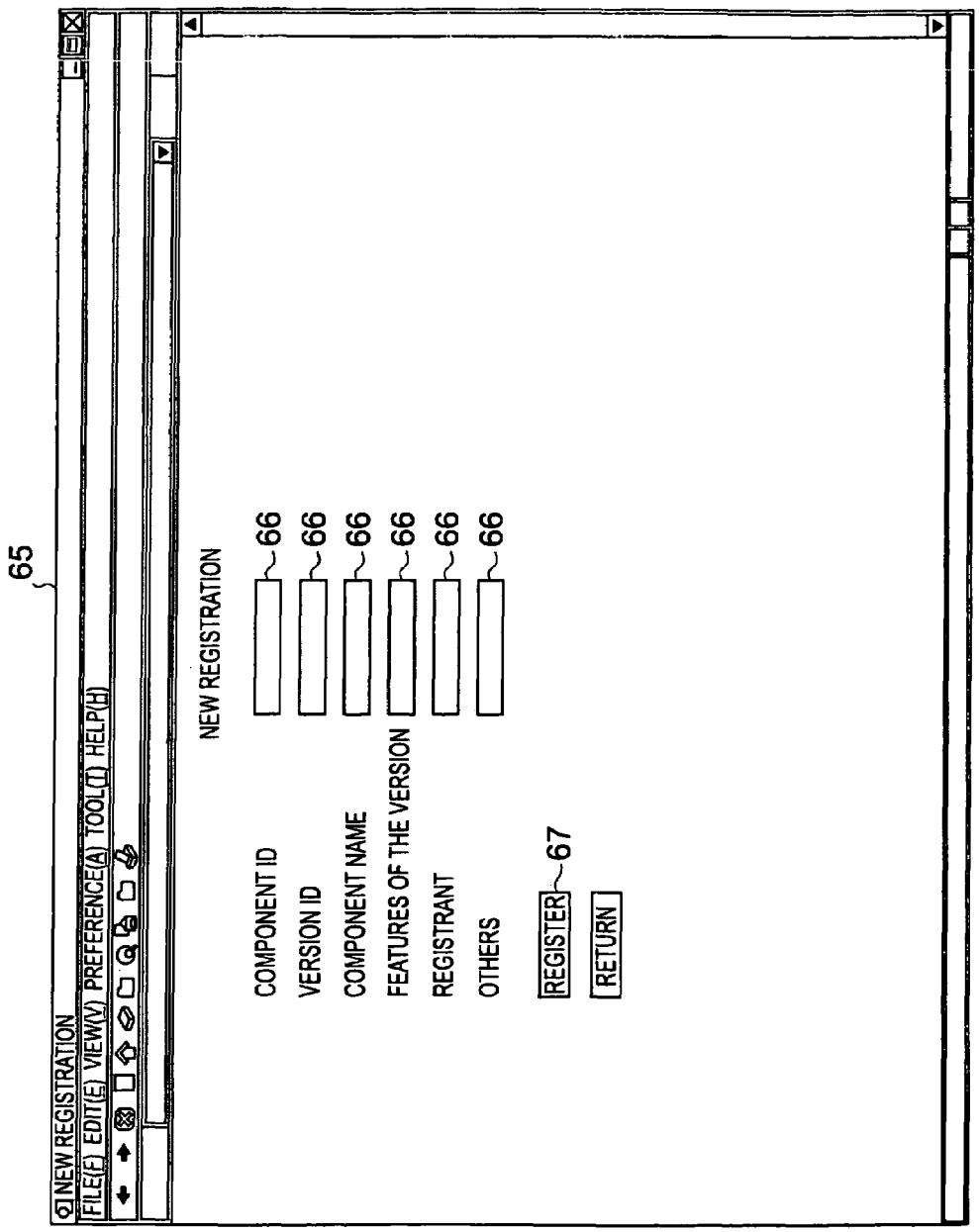
FIG. 9 is a diagram showing a component new registration entry window.
Figure 10:
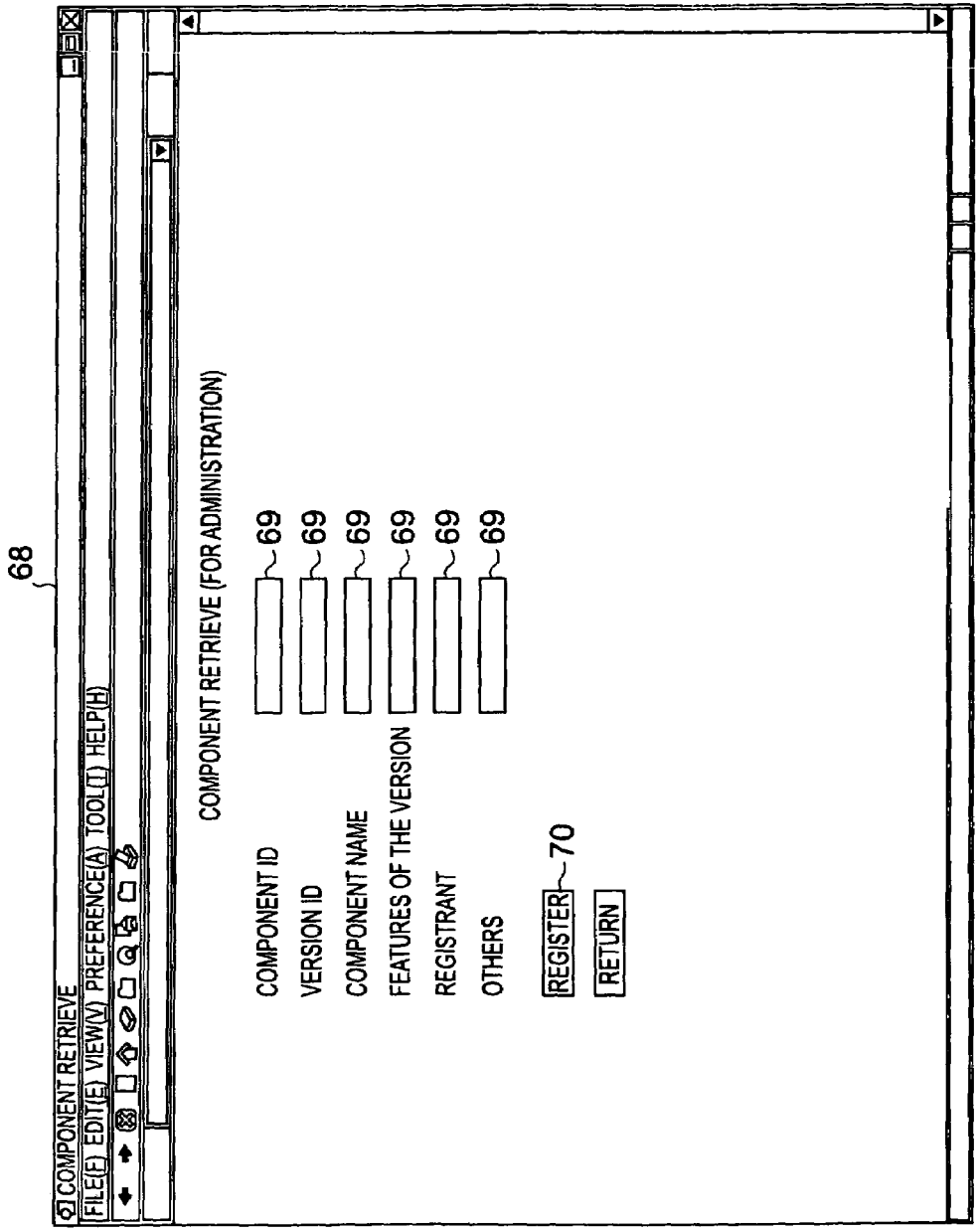
FIG. 10 is a diagram showing a component retrieve window (for administration)
Figure 17:
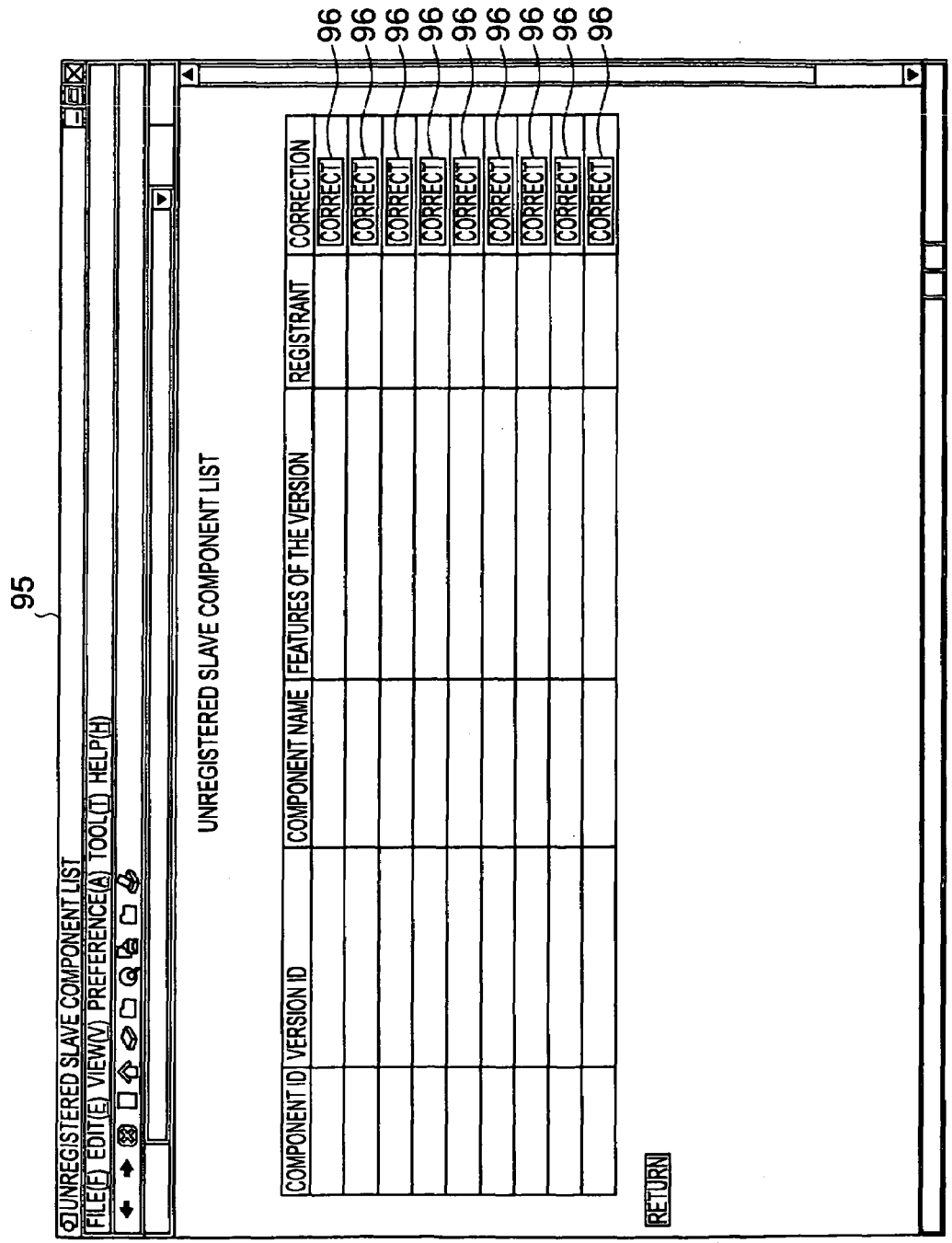
FIG. 17 is a diagram showing an unregistered slave component list window (slave link/non-confirmed operation list window)

In the component administration menu window 60 as in FIG. 8, a "new registration" button 61 is selected to evoke a new registration entry unit 22 (see FIG. 3) through the component administration/registration function menu display unit 21, and a new registration entry window 65 shown in FIG. 9 is displayed. In the component administration menu window 60 in FIG. 8, an "update/edit/delete" button 62 is selected to evoke a component retrieve unit 24 (see FIG. 3) through the component administration/registration function menu display unit 21, and an administrative-purpose component search window 68 shown in FIG. 10 is displayed. In the component administration menu window 60 in FIG. 8, selecting a "slave link/non-confirmed operation list" button 63 causes a slave link (s) to evoke a slave link/non-confirmed operation list creating unit 37 (see FIG. 3) through the component administration/registration function menu display unit 21, and an unregistered slave component list (slave link/non-confirmed operation list) 95, as shown in FIG. 17, is displayed. Moreover, in the component administration menu window 60 in FIG. 8, a "master link/non-confirmed operation list" button 64 is selected to evoke a master link/non-confirmed operation list creating unit 38 (see FIG. 3) through the component administration/registration function menu display unit 21, and an unregistered master component list 97, as shown in FIG. 18, (master link/non-confirmed operation list) is produced.

In the new registration entry window 65 in FIG. 9, after fields 66 are filled with registration information on a software component to be newly registered (i.e., component ID, version ID, component name, features of the version, registrant, etc.), a "register" button 67 is selected to evoke a new registration confirmation unit 23 (see FIG. 3) through the new registration entry unit 22, and thus, a new registration of the software component is carried out to the component database 5.

Also, in the administrative-purpose component search window 68 in FIG. 10, after fields 69 are filled with the conditions required for a search for a desired software component(s) (component ID, version ID, component name, features of the version, registrant, etc.), a "retrieve" button 70 is selected so that a software component(s) satisfying the entered conditions is sought for from the component database 5 by the component retrieve unit 24 (see FIG. 3). The software component(s) retrieved by the component retrieve unit 24 is listed in an administrative-purpose component list 71 as shown in FIG. 11.

Figure 12:
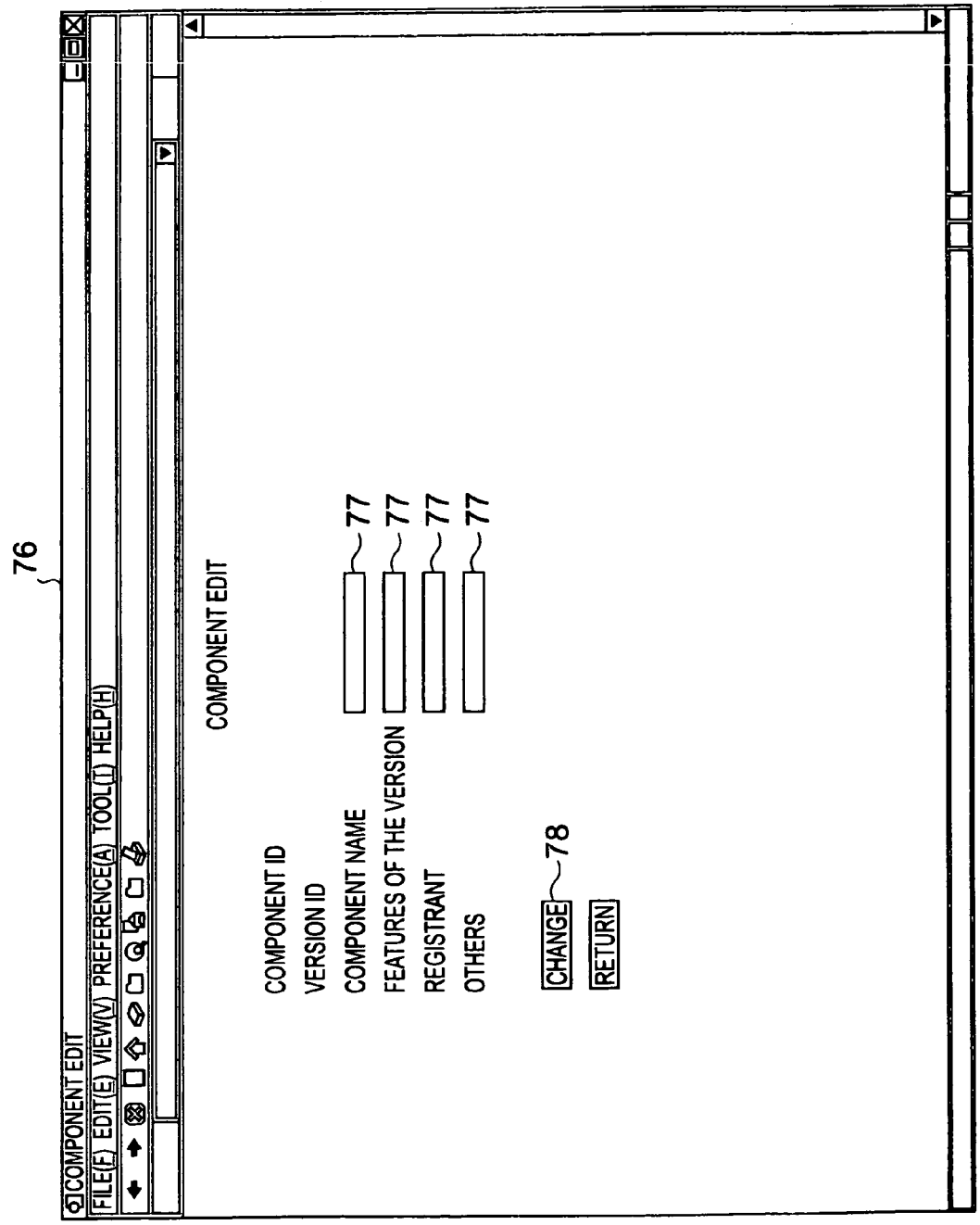
FIG. 12 is a diagram showing a component registration info edit window.
Figure 13:
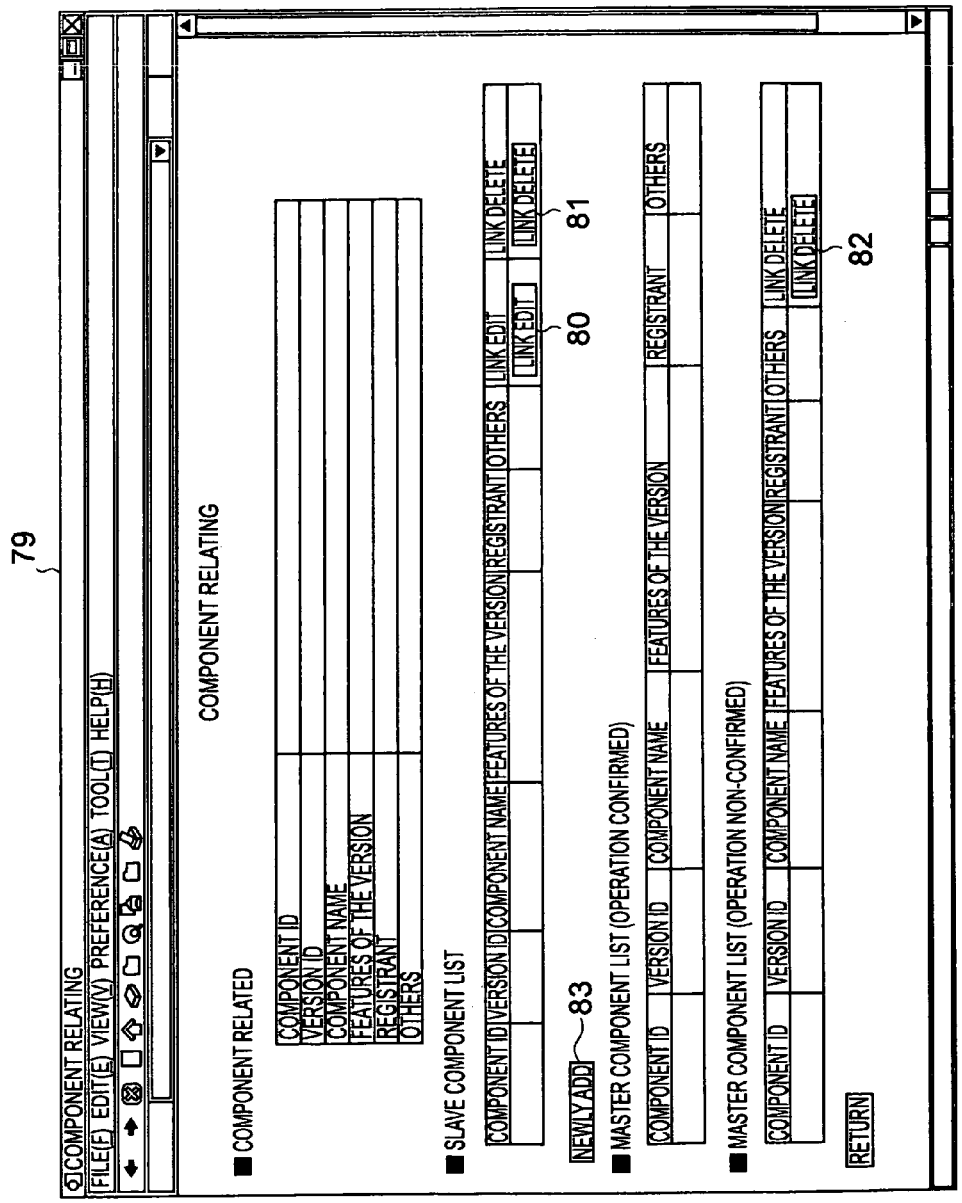
FIG. 13 is a diagram showing an inter-component relation edit window.
Figure 15:
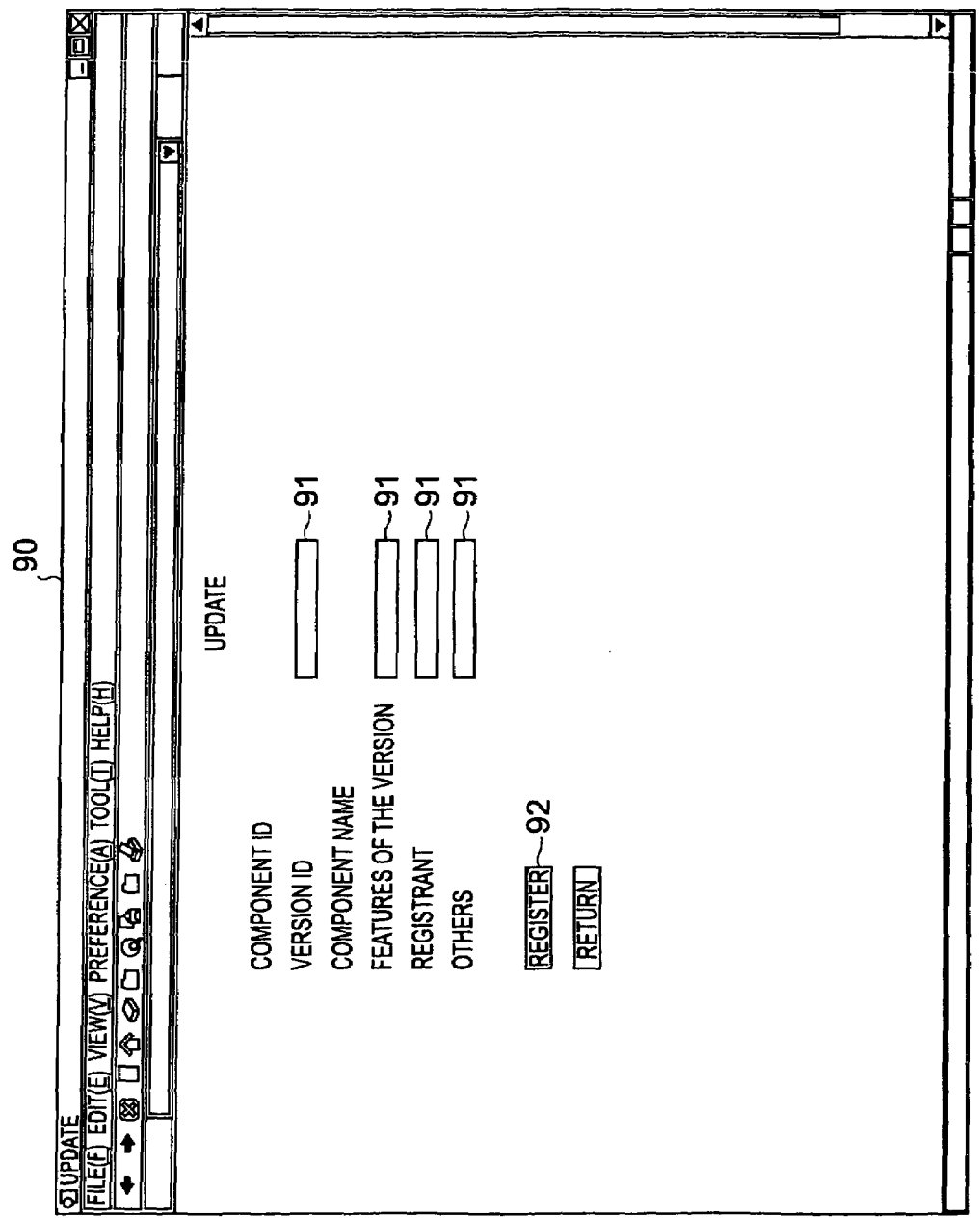
FIG. 15 is a diagram showing a component update register window.
Figure 16:
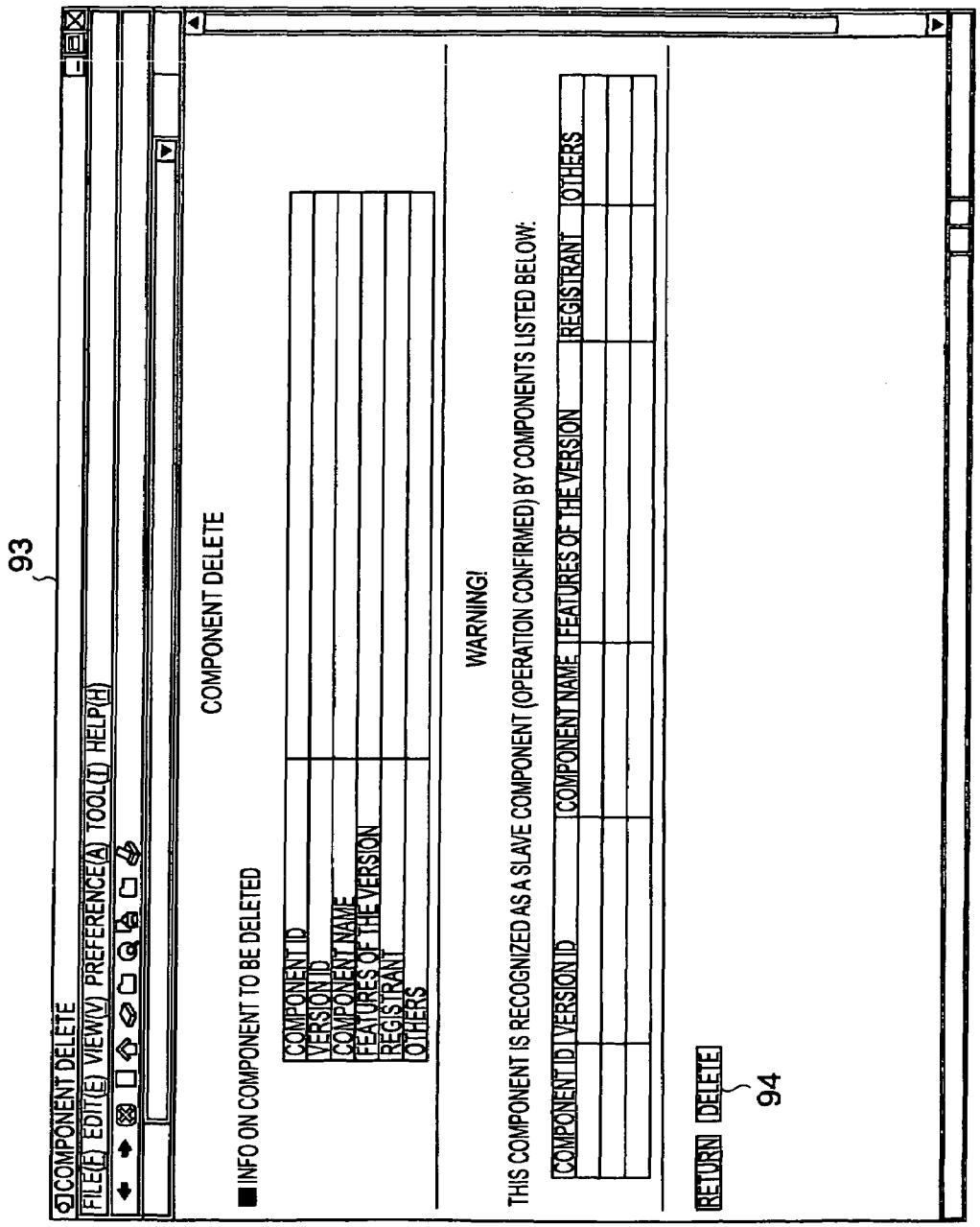
FIG. 16 is a diagram showing a component delete window.

In the component list 71 as in FIG. 11, selecting a "correct" button 72 attached to a desired software component results in a registration correction unit 35 (see FIG. 3) being evoked through the component retrieve unit 24, and a registered info edit window 76 shown in FIG. 12 is produced in relation to the desired software component. In the administrative-purpose component list 71 as in FIG. 11, a "relate" button 73 attached to a desired software component is selected to evoke an inter-component relation entry unit 25 (see FIG. 3) through the component retrieve unit 24, and an inter-component relation edit window 79 as shown in FIG. 13 is displayed in relation with the desired software component. Additionally, in the administrative-purpose component list 71 shown in FIG. 11, an "update" button 74 attached to a desired software component is selected to evoke an update registration unit 29 (see FIG. 3) through the component retrieve unit 24, and a component update registration window 90 shown in FIG. 15 is produced in relation to the software component. Furthermore, in the administrative-purpose component list 71 as in FIG. 11, a "delete" button 75 attached to a desired software component is selected to evoke a component delete unit 32 (see FIG. 3) through the component retrieve unit 24, and a component delete window 93 as shown in FIG. 16 is displayed in relation to the desired software component.

In the registered info edit window 76 shown in FIG. 12, after fields 77 are filled with registration information to change on the software component (component name, features of the version, registrant, etc.), a "change" button 78 is selected to evoke a correction entry unit 36 (see FIG. 3) through the registration correction unit 35, and thus, the component database 5 has its registered info on the software component corrected. Displayed in the fields 77 of the registered info edit window 76 shown in FIG. 12 are the registration info which have already existed as default values.

Figure 14:
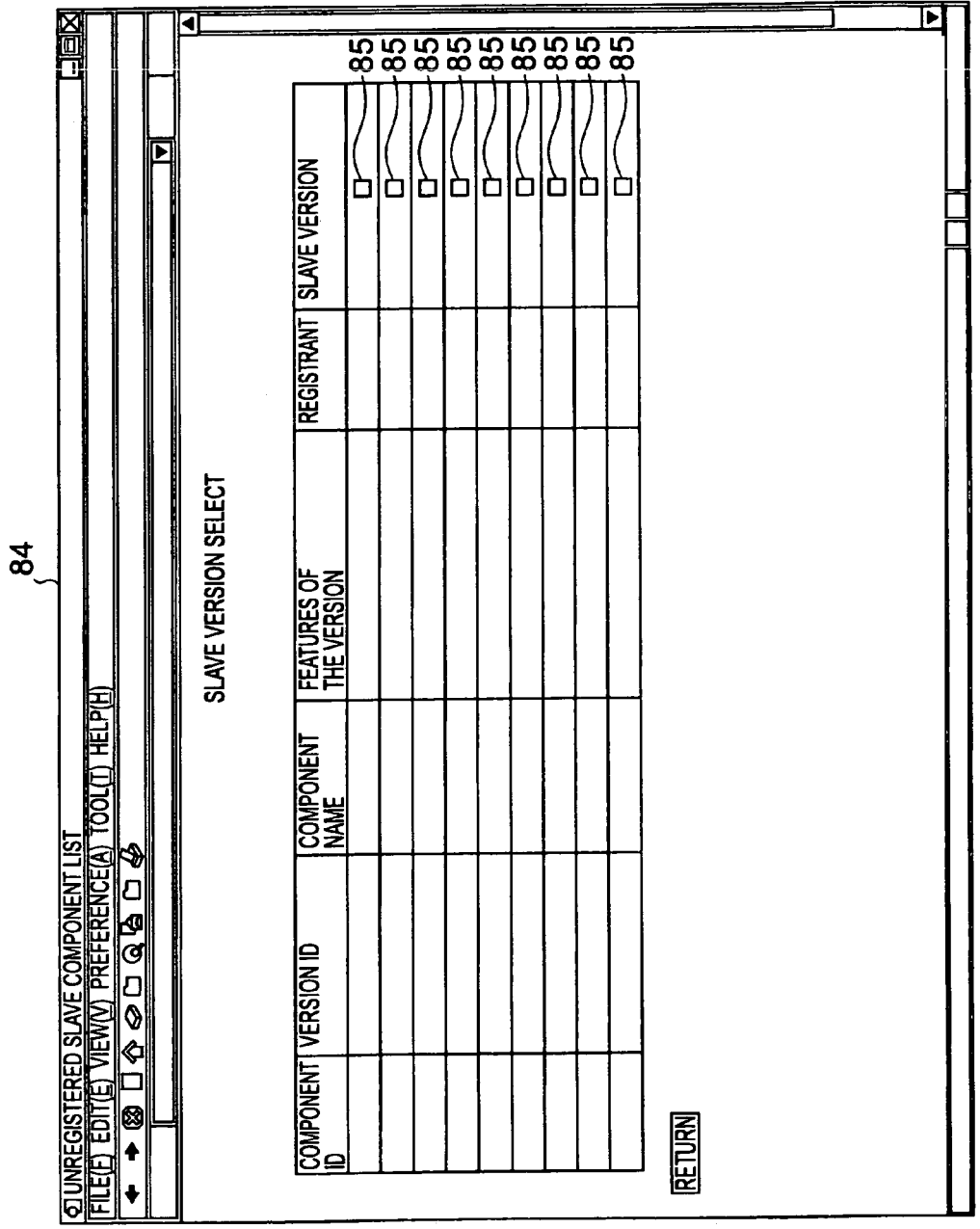
FIG. 14 is a diagram showing a component version select window used to select a destination of a slave link.

In the inter-component relation edit window 79 shown in FIG. 13, selecting a "link edit" button 80 attached to a desired one of slave components which the specified software component uses causes a slave link related point retrieve unit 26 (see FIG. 3) to be evoked through the inter-component relation entry unit 25, and a component version select window 84 shown in FIG. 14 is displayed in relation with the slave component. In the component version select window 84 in FIG. 14, checking some of blanks 85 in the column "version" to select a desired slave component(s) results in a slave component link unit 27 (see FIG. 3) being evoked through the inter-component relation entry unit 25, and the relation info (slave link(s)) on the software component is registered in the component database 5. In simultaneous with this, a master component automated link unit 28 is evoked through the slave component link unit 27 (see FIG. 3). In this way, a master link(s) corresponding to a slave link(s) on the software component registered by the slave component link unit 27 is automatically created so as to register it in the component database 5 as relation info (master link (s)) of the software component.

In the inter-component relation edit window 79 shown in FIG. 13, selecting a "link delete" button 81 attached to a desired one of slave components which the software component uses, or, selecting another "link delete" button 82 attached to a desired one of master components by which the software component is used, the slave link of the software component, or the master link of which operation has not completely confirmed can be deleted. Additionally, an "addition" button 83 is selected in relation with the slave component to display a component retrieve window 99 (in relation with links) (see FIG. 29) for seeking for a slave component(s) which the software component uses. In this case, finally, using an operation window similar to the component version select window 84 shown in FIG. 14, relation info (slave link(s)) of the software component is registered in the component database 5.

Moreover, in the component update register window 90 shown in FIG. 15, after fields 91 are filled with registration information on the software component (version ID, features of the version, registrant, etc.), which is to be updated and registered, selecting a "register" button 92 evokes an updated registration confirmation unit 30 (see FIG. 3) through the update registration unit 29, and thus, a software component updated from the registered software component is newly registered in the component database 5. Displayed in the fields of the component update register window 90 in FIG. 15 are registered info of the software component of the previous version as default values.

After the update registration confirmation unit 30 (see FIG. 3) newly registers a software component updated from the software component in the component database 5, an automated link creating unit 31 (see FIG. 3) is evoked through the update registration confirmation unit 30 to produce a renewed relation information containing sub-information that an inter-component operation has not been confirmed, based upon relation information (slave link and master link) corresponding to the previous version of the software component, and the resultant information is registered in the component database 5. Specifically, the same group of different versions of a software component stored in the component database 5 are administratively treated as a single cluster of the versions, and automatically created based upon relation information (master and slave links) corresponding to the previous version corresponding to the software component are renewed master and slave links which represent relations between the software component and the cluster of the versions of the master and slave component related to the software component, and the relation information (master and slave links) of the software component are registered in the component database 5.

Further, in the component delete window 93 in FIG. 16, the registration information of the software component, which is to be deleted, is displayed by the component delete unit 32 (see FIG. 3). Simultaneously, the component delete unit 32 evokes an alert window creating unit 33 (see FIG. 3) to search for the presence of the master component(s) by which the software component is used, based upon the relation information (master link(s)) corresponding to the software component, and if present, they are listed and put on a display (as an alert). In the component delete window 93 shown in FIG. 16, a "delete" button 94 is selected to evoke a delete-entry unit 36 (see FIG. 3) through the component delete unit 32, and thus, the software component is deleted from the component database 5.

Furthermore, in an unregistered slave component list 95 shown in FIG. 17, a combination(s) of the software components leaving their respective slave links unregistered (or, leaving their operations non-confirmed) is listed and put on a display, based upon the relation information (slave link(s)) corresponding to the software component, by the slave link/non-confirmed operation list creating unit 37 (see FIG. 3). At this stage of the procedure, a "correct" button 96 attached to a desired software component is selected to produce the inter-component relation edit window 79 shown in FIG. 79 in relation to the desired software component, and the slave link(s) of the software component is corrected.

In an unregistered master component list 97 shown in FIG. 18, a combination(s) of the software components leaving their master links unregistered (i.e., leaving their operations non-confirmed) is listed and put on a display, based upon the relation information (master link(s)) corresponding to the software component, by the master link/non-confirmed operation list creating unit 38 (see FIG. 3). At this sate of the procedure, a "correct" button 98 attached to a desired software component is selected to produce the inter-component relation edit window 79 shown in FIG. 79 in relation to the desired software component, and the master link(s) of the software component is corrected.

As shown in FIG. 3, the component administration/registration function unit 20 has a component administration unit 39 performing additional processes related to the software component administration, which is evoked by the component administration/registration function menu display unit 21.

Now, functions of the preferred embodiment configured as mentioned above will be described in detail, with reference to FIGS. 19 to 60.

Initial State

FIG. 19 is a diagram illustrating an initial state of groups of the software components under administration. As shown in FIG. 19, there are two groups of the software components (clusters of versions), "A001" and "B001", and it is now assumed that the group A001 includes two of the software components, Ver. 1.0 and Ver. 1.1 while the group B001 includes three of the software components, Ver. 1.0, Ver. 1.1, and Ver. 2.0. The Ver. 1.0 in the component group A001 and the Ver. 2.0 in the group B001, and the Ver. 1.1 in the A001 and the Ver. 2.0 in the B001 establish slave and master links therebetween, respectively.

A component table containing the groups of the software components in the initial state in FIG. 19 is transformed into a table as shown in FIG. 20. In the component table shown in FIG. 20, five of the software components included in the two groups of the software components have their respective component IDs, version IDs, component names, features of the versions, registrants, etc. registered. Also, as shown in FIG. 20, the two component groups (clusters of the versions) identified with A001 and B001 are also registered as separate software components (numbered "−1" as version ID) by themselves.

Figures 22, 23:
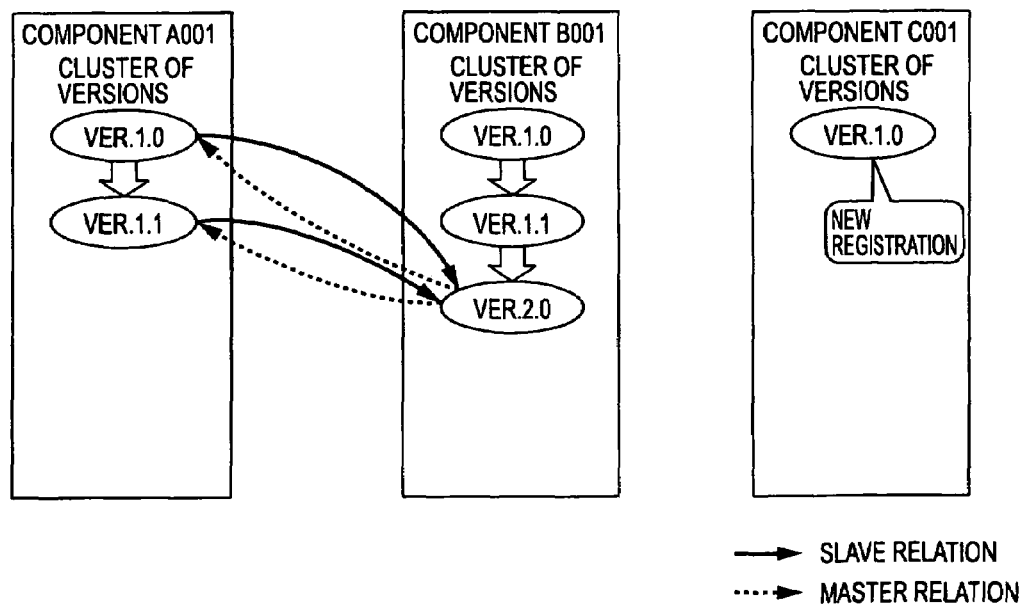
FIG. 22 is a diagram showing a master link table of the software component groups in the initial state.
FIG. 23 is a diagram illustrating a manner of a new registration of a software component (Ver. 1.0 of a component C001)

A slave link table and a master link table of the groups of the software components at the initial state shown in FIG. 19 are like those shown in FIGS. 21 and 22. In the slave link table shown in FIG. 21, a set of information of start-point and destination software components with respect to a single slave link (component IDs and version IDs) are registered. Similarly, in the master link table shown in FIG. 22, a set of information of start-point and destination software components with respect to a single master link (component IDs and version IDs) are registered.

Exemplary Operation 1

First, a first exemplary operation will be described in which a software component (Ver. 1.0 of a component C001) is newly registered and added to the groups of the software components at the initial state in FIG. 19 (see FIG. 23).

Figure 24:
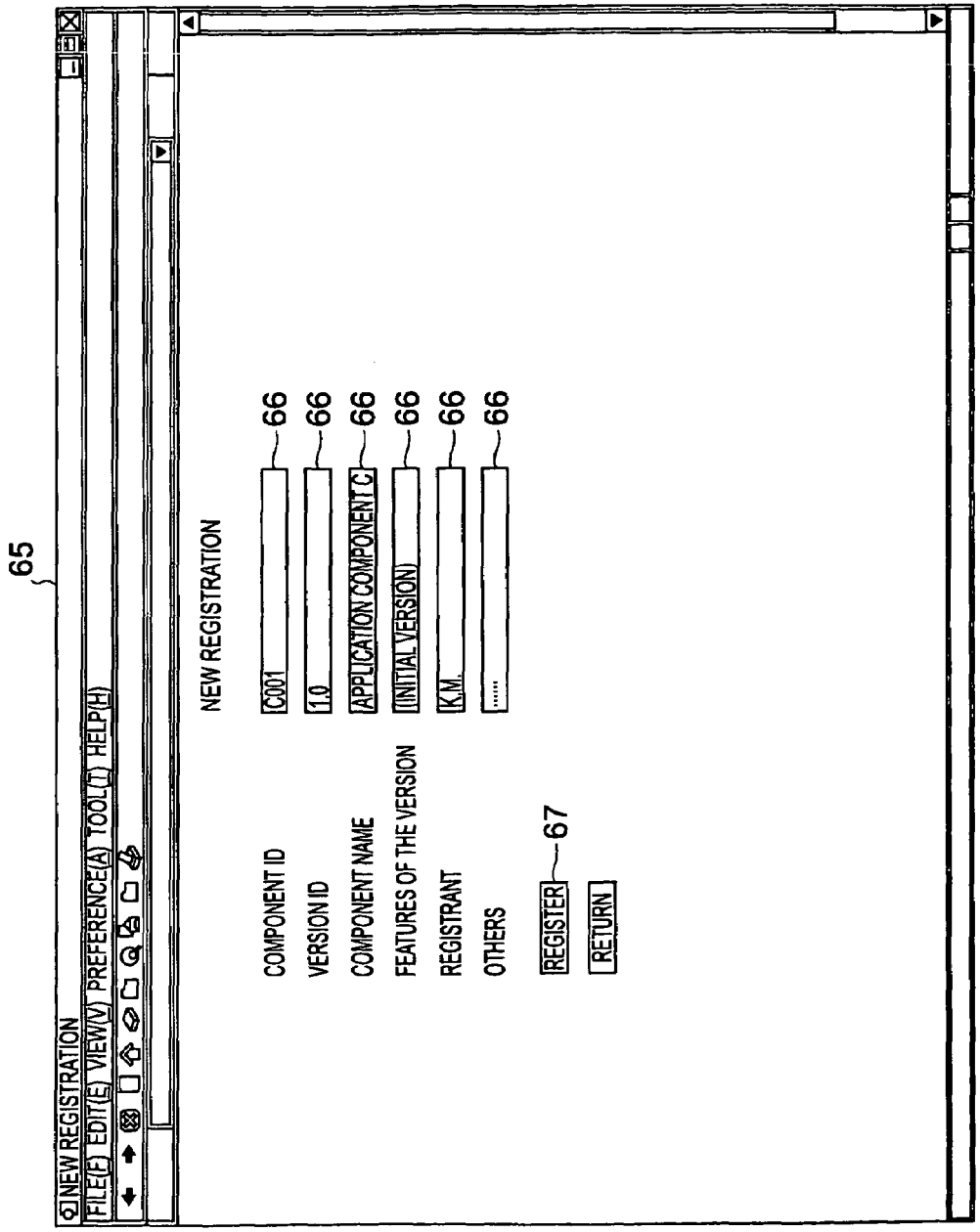
FIG. 24 is a diagram illustrating a manner of entering registration information in the component new registration entry window in relation with the software component (Ver. 1.0 of the component C001)

In the component administration menu window 60 in FIG. 8, when the "new registration" button 61 is selected, the new registration entry window 65 shown in FIG. 9 is displayed. In the new registration entry window 65, as shown in FIG. 24, entered in the fields 66 are registration information on the software component which is to be newly registered, including component ID (C001), version ID (1.0), component name (application component C), features of the version (initial version), registrant (K.M.), etc. as shown " . . . ", and thereafter, selecting the "register" button 67 results in the software component (Ver. 1.0 of the component C001) being newly registered in the component database 5.

At this time, the component table stored in the component database 5 is like that shown in FIG. 25.

Exemplary Operation 2

A second exemplary operation will now be described in which a slave link(s) of the software component (Ver. 1.0 of the component C001) is newly registered (edited) (see FIG. 26) and added to the groups of the software components resulted from the Operation 1 (see FIG. 23).

Figure 27:
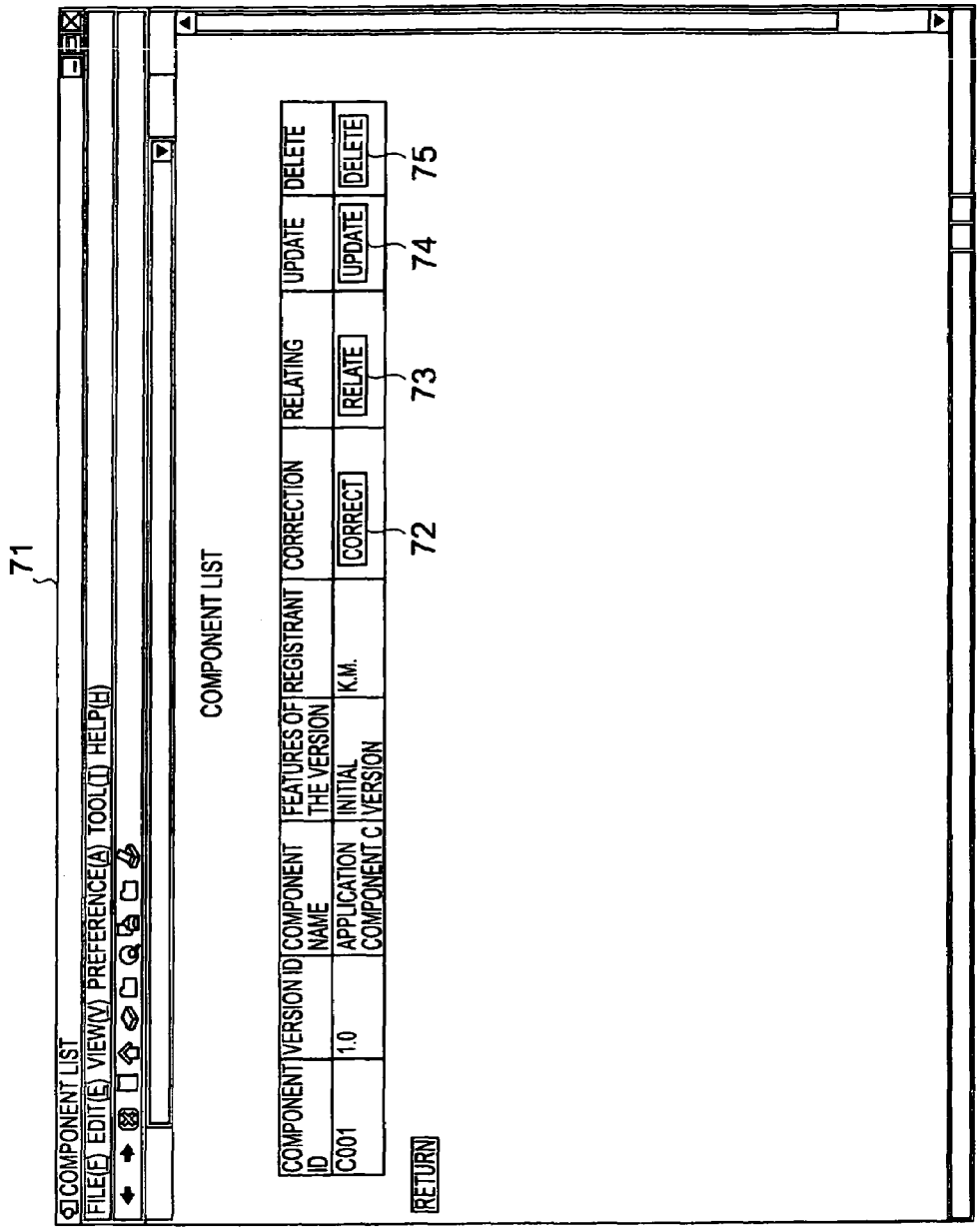
FIG. 27 is a diagram showing a retrieval result of the software component (Ver. 1.0 of the component C001)

In the component administration menu window 60 shown in FIG. 8, selecting the "update/edit relation/delete" button 62 causes the administrative-purpose component retrieve window 68 shown in FIG. 10 to appear on the display. In the administrative-purpose component retrieve window 68, after the fields 69 are filled with the conditions necessary for a retrieval of the software component (component IDs, version IDs, component names, features of the versions, registrants, etc.), the "retrieve" button 75 is selected to retrieve from the component database 5 a software component(s) meeting the retrieval conditions such as component ID (C001) and version ID (1.0). FIG. 27 depicts the administrative-purpose component list 71 produced as a result of the retrieval.

Figure 28:
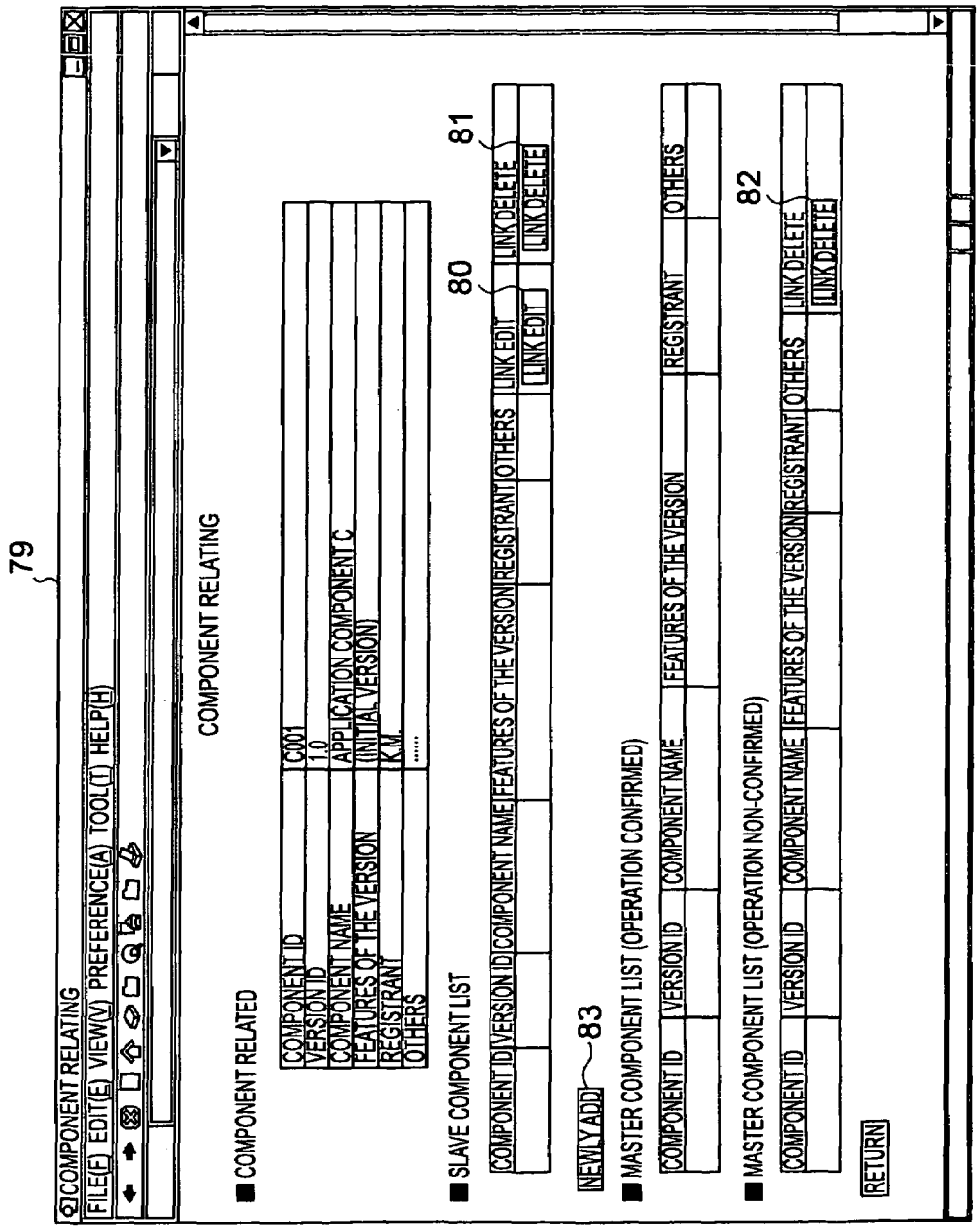
FIG. 28 is a diagram showing an inter-component relation edit window in relation with the software component (Ver. 1.0 of the component C001)

In the administrative-purpose component list shown in FIG. 27, the "relation" button 73 is selected to display the inter-component relation edit window 79 shown in FIG. 28.

Figure 29:
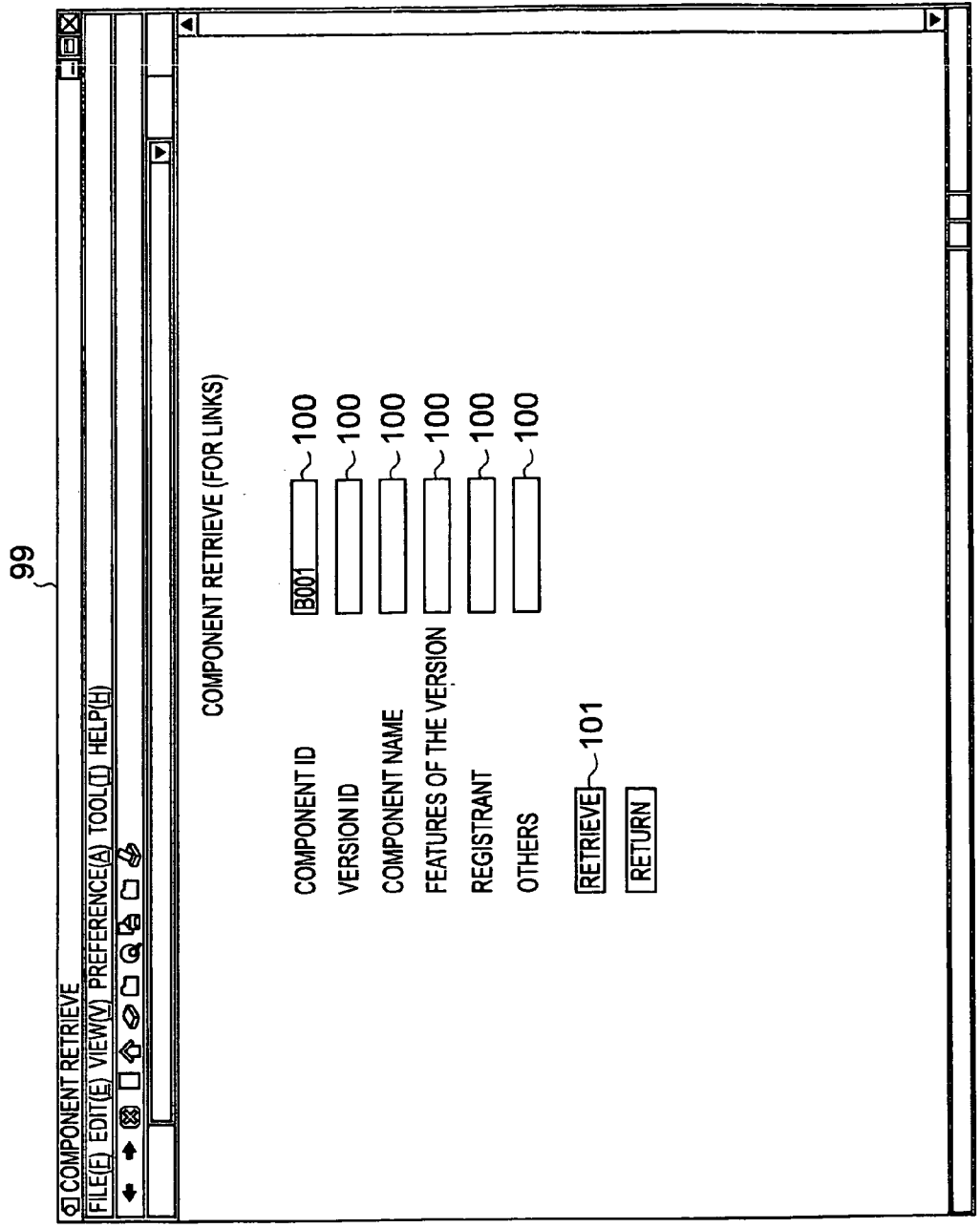
FIG. 29 is a diagram showing a component retrieve window (for links) for a software component (component B001) which is a destination of a slave link of the software component (Ver. 1.0 of the component C001)
Figure 30:
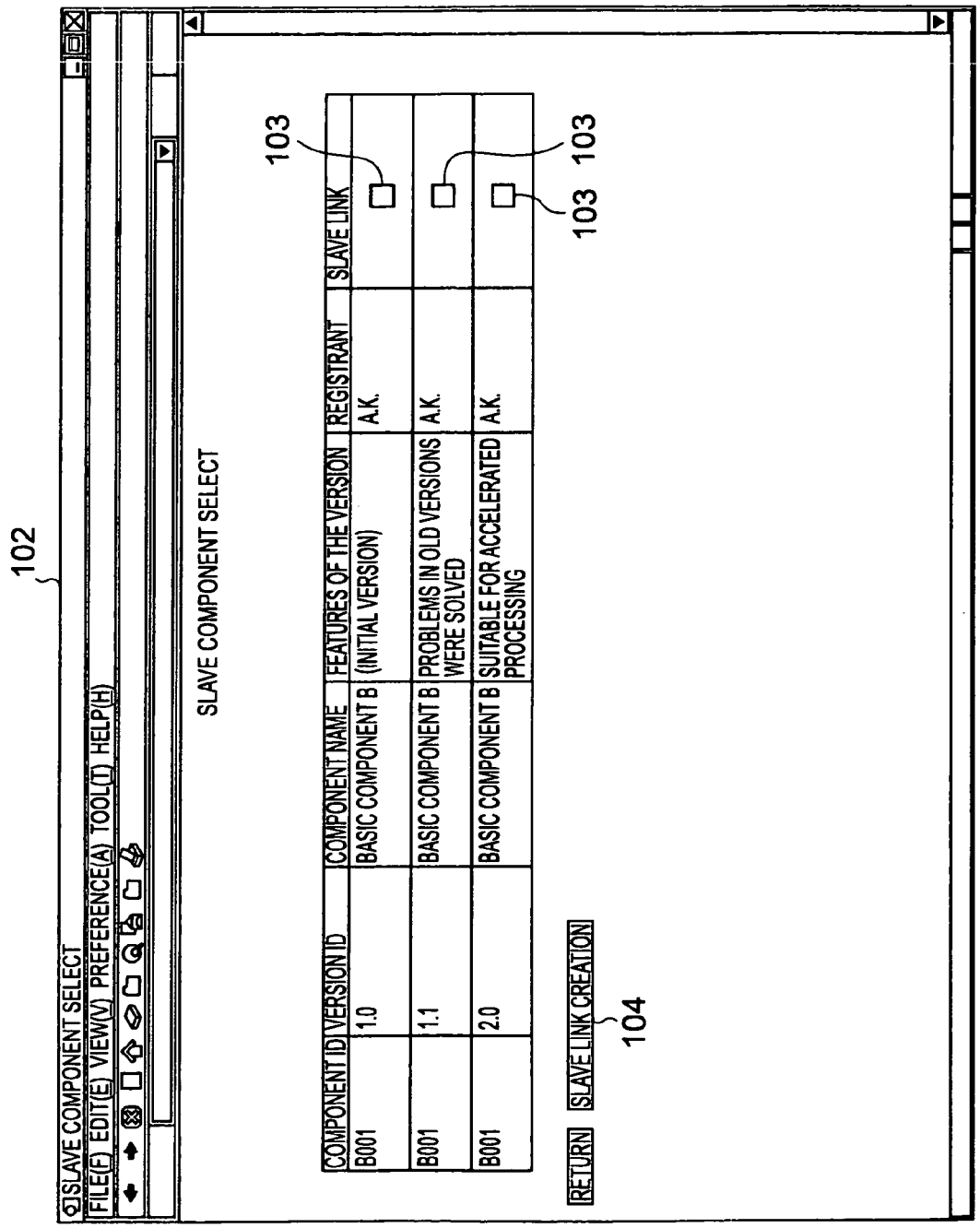
FIG. 30 is a diagram showing a slave component select window for the software component (component B001) which is a destination of a slave link.

In the inter-component relation edit window 79 shown in FIG. 28, the "new registration" button 83 is selected to display the component retrieve window 99 (in relation with links) in FIG. 29, and consequently, a slave component(s) which the software component uses can be retrieved. In this case, as can be seen in FIG. 29, a component ID "B001" is entered for a retrieval. FIG. 30 depicts a slave component select window 102 produced as a result of the retrieval.

In the slave component select window 102 in FIG. 30, checking a blank 103 in the column "slave link" to select a desired component Ver. 2.0 of the component B001 and selecting a "create slave link" button 104, the relation information (slave link(s)) of the software component is registered in the component database 5. In simultaneous with this, a master link(s) corresponding to the registered slave link is automatically created and registered in the component database 5 as the relation information (master link(s)) of the software component. Specifically, the slave link relating the Ver. 1.0 of the component C001 to the Ver. 2.0 of the component B001 is registered while the master link relating the Ver. 2.0 of the component B001 to the Ver. 1.0 of the component C001 is automatically registered.

Figures 31, 32, 33:
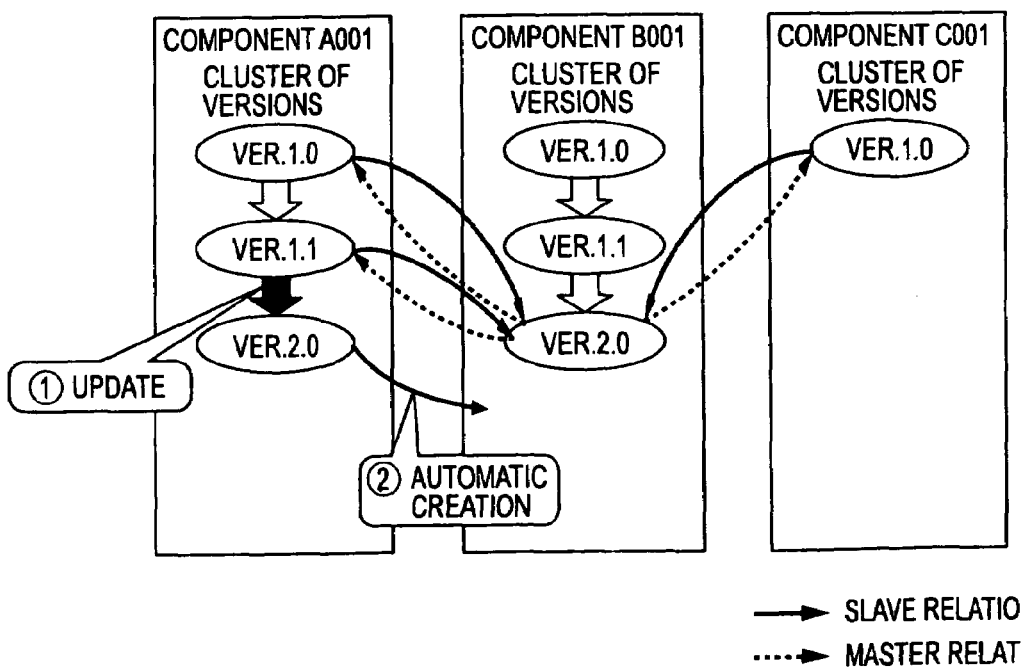
FIG. 31 is a diagram showing a slave link table upon editing (newly registering) a slave link of the software component (Ver. 1.0 of the component C001)
FIG. 32 is a diagram showing a master link table upon editing (newly registering) a slave link of the software component (Ver. 1.0 of the component C001)
FIG. 33 is a diagram showing a manner of updating a software component (component A001) from Ver. 1.1 to Ver. 2.0.

At this time, the master and slave link tables stored in the component database 5 are like those shown in FIGS. 31 and 32.

Exemplary Operation 3

A third exemplary operation will be described in which the software component (A001) updated from the Ver. 1.1 to the Ver. 1.2 is newly registered (see FIG. 33) and added to the groups of the software components resulted from the Operation 2 (see FIG. 26).

Figure 34:
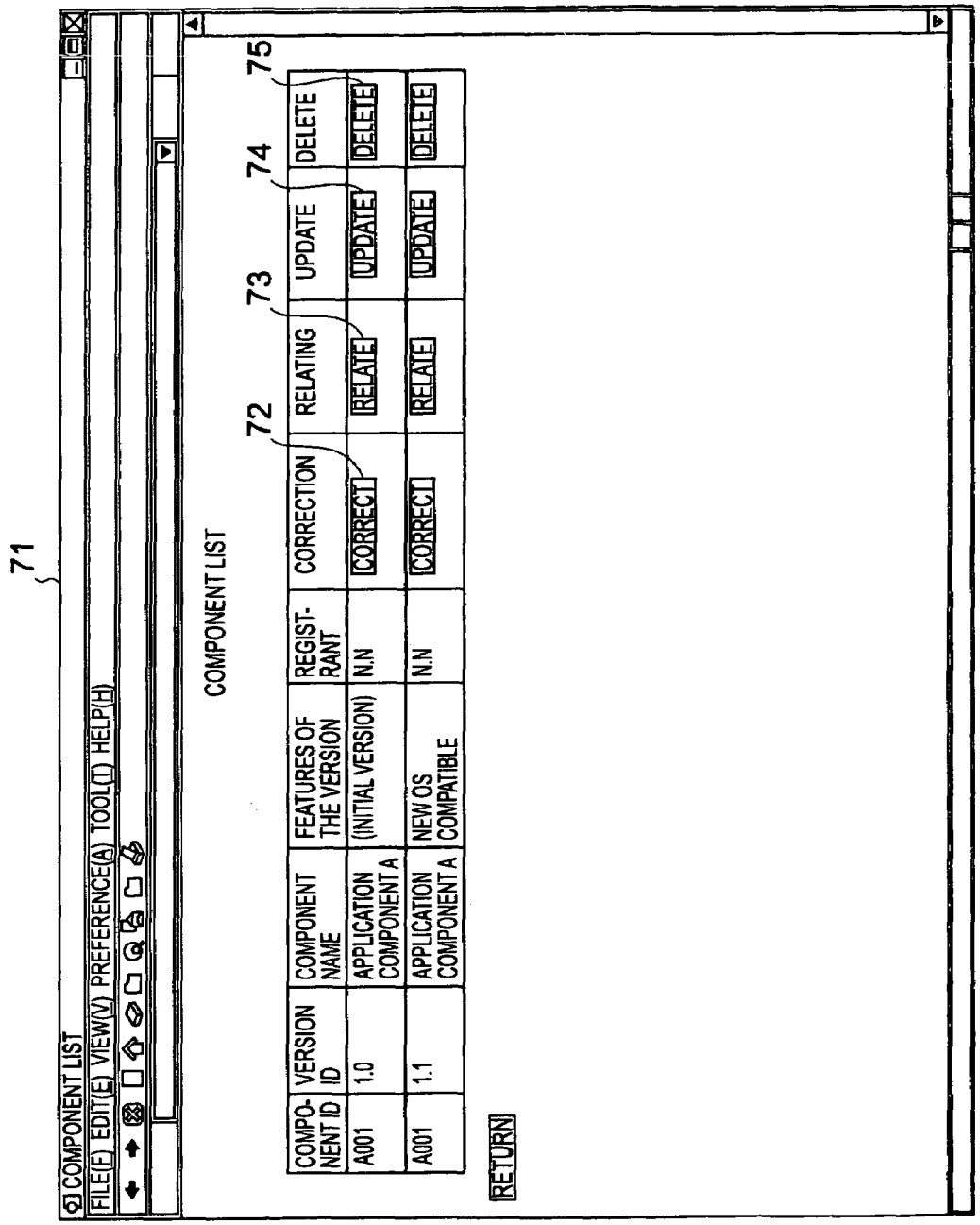
FIG. 34 is a diagram showing a result of retrieving the software component (component A001)

First, following a procedure similar to that of the Operation 2, a software component(s) meeting the retrieval conditions (component ID, namely, A001) is retrieved from the component database 5. FIG. 34 depicts a component list 71 (for administration purpose) produced as a result of the retrieval.

Figure 35:
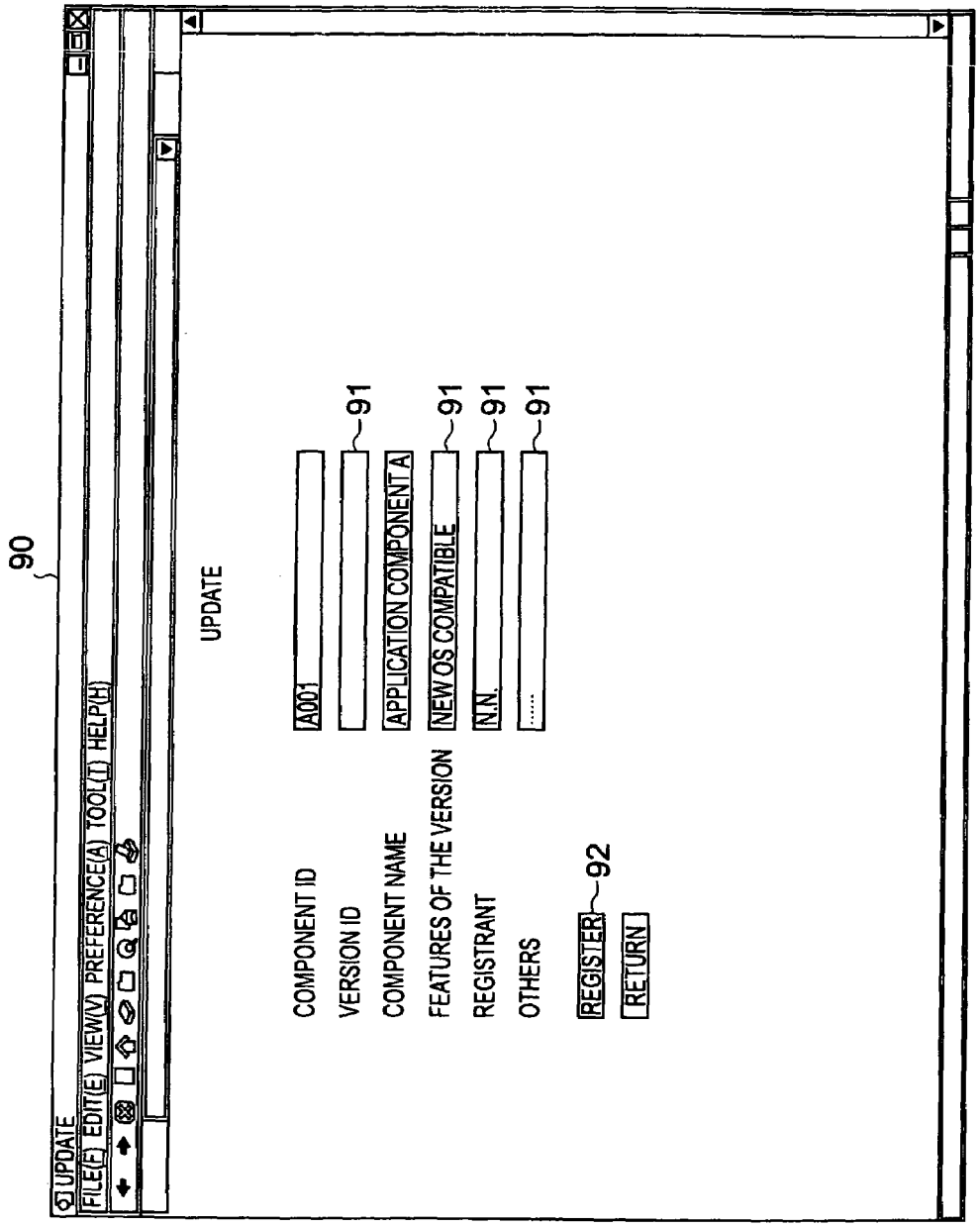
FIG. 35 is a diagram showing a component update register window for the software component (component A001)
Figure 36:
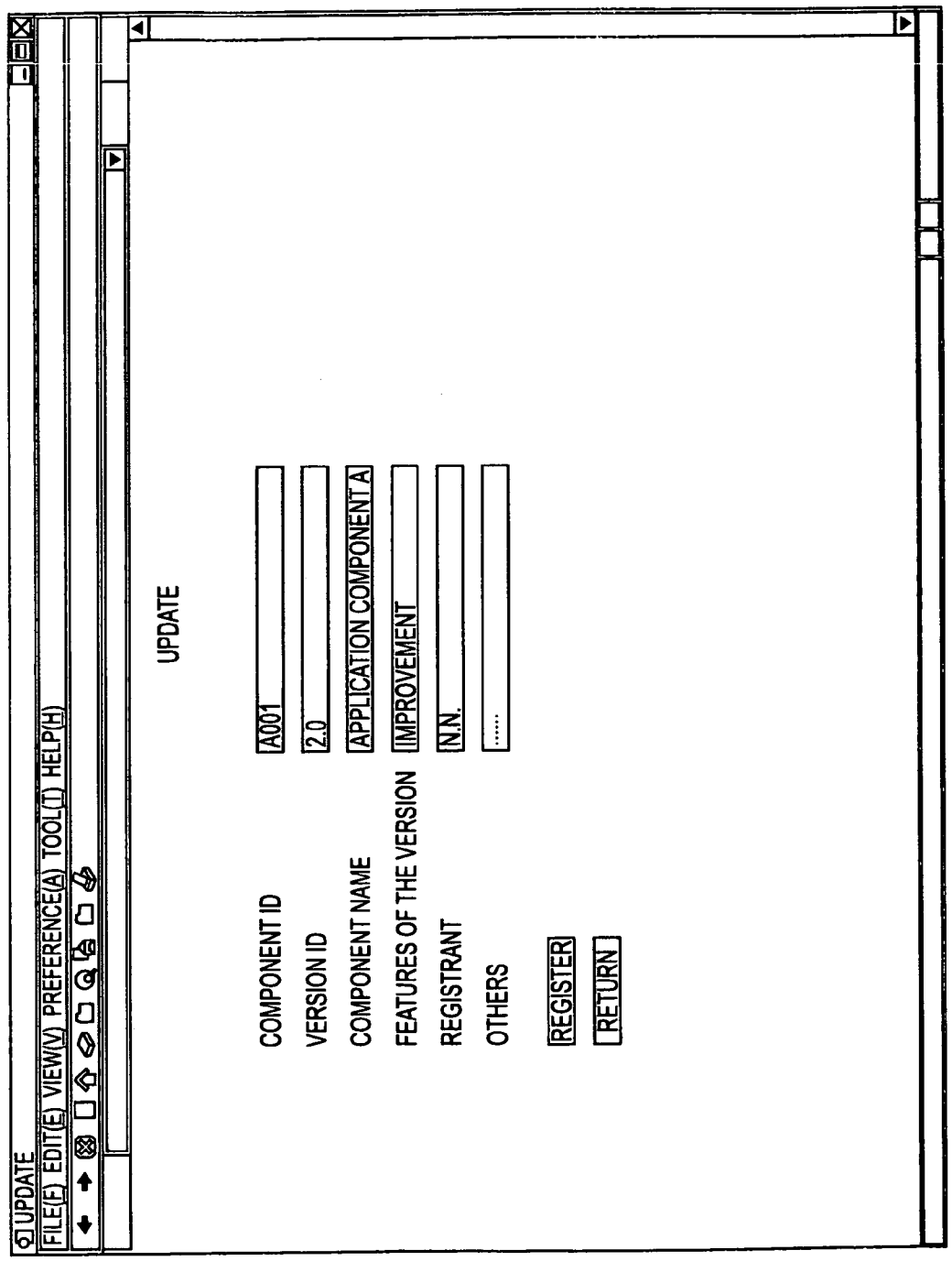
FIG. 36 is a diagram illustrating a manner of entering registration information in the component update register window for the software component (component A001)

In the component list 71 shown in FIG. 34, the "update" button 74 associated with the Ver. 1.1 of the component A001 is selected to produce the component update registration window 90 in FIG. 35 on the display.

In the component update registration window 90 in FIG. 35, after the fields 91 are filled with the registration information of the software component to update (version ID, features of the version, registrant, etc.) (see FIG. 36), selecting the "register" button 92 results in a renewed registration in the component database 5 as an updated version of the software component. Within the fields 91 in the component update registration window 90 shown in FIG. 35 (i.e., fields related to "features of the version", "registrant", and the like), the registration information of the previous version of the software component are stored as default values (see FIG. 35).

When the updated version of the software component is newly registered in the component database 5, a renewed slave link, which relates the software component with the cluster of the versions of the slave component(s) related with the software component, is automatically created (see FIG. 33) based upon the relation information (slave link(s)) corresponding to the previous version of the software component. Specifically, the slave link relating the Ver. 2.0 of the component A001 to the cluster of the versions (version ID numbered "–1") of the component B001 is registered.

At this time, the component table and the slave link table stored in the component database 5 are like those shown in FIGS. 37 and 38, respectively.

Exemplary Operation 4

A fourth exemplary operation will now be described in which a slave link relating the Ver. 2.0 of the component A001 to the component B001 is corrected (edited) (see FIG. 39) in the groups of the software components resulted from the Operation 3 (see FIG. 33).

In the component administration menu window 60 shown in FIG. 8, selecting the "slave link/non-confirmed operation list" button 63 causes the unregistered slave component list (slave link/non-confirmed operation list) 95 to be displayed.

Figure 40:
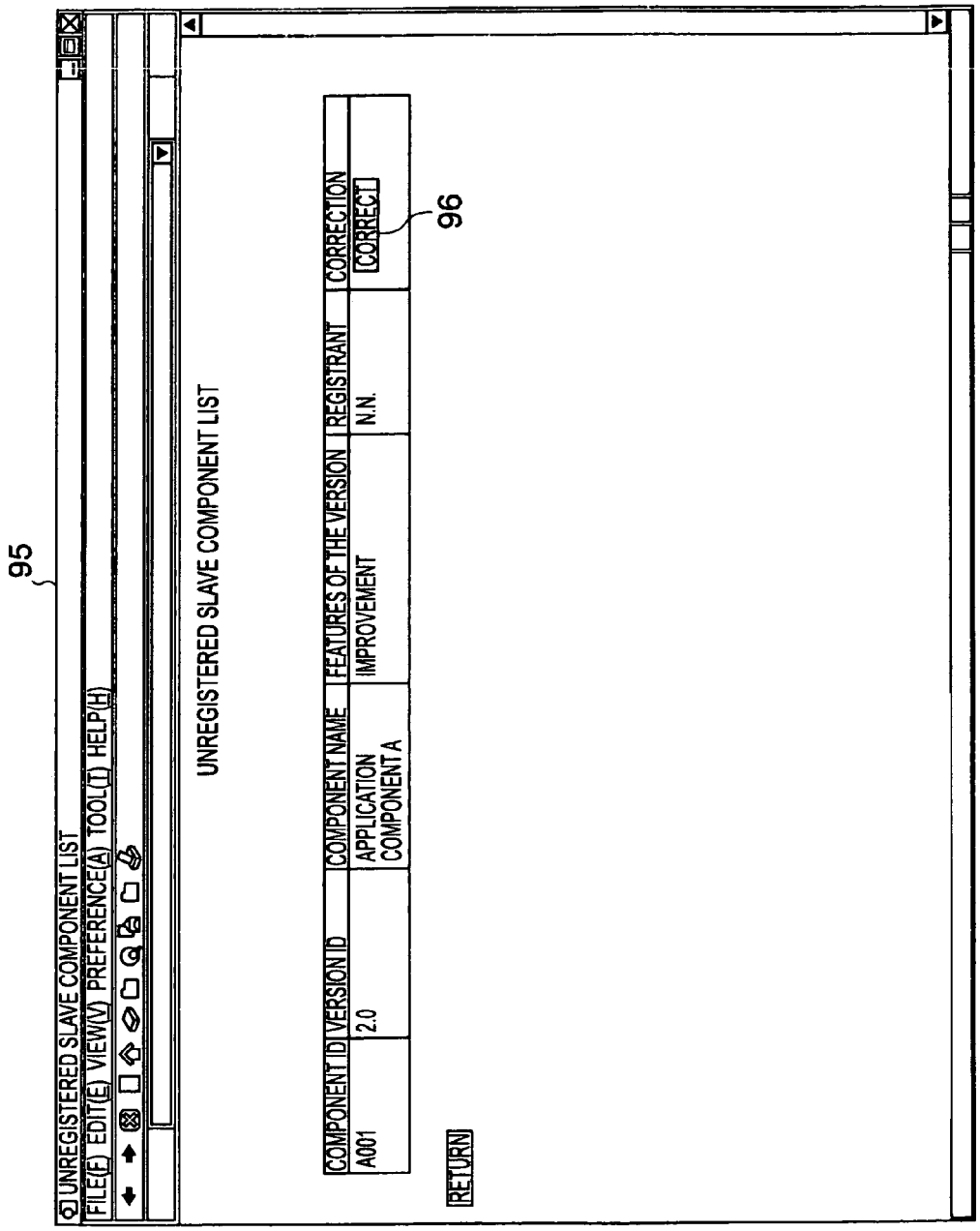
FIG. 40 is a diagram showing an unregistered slave component list.
Figure 41:
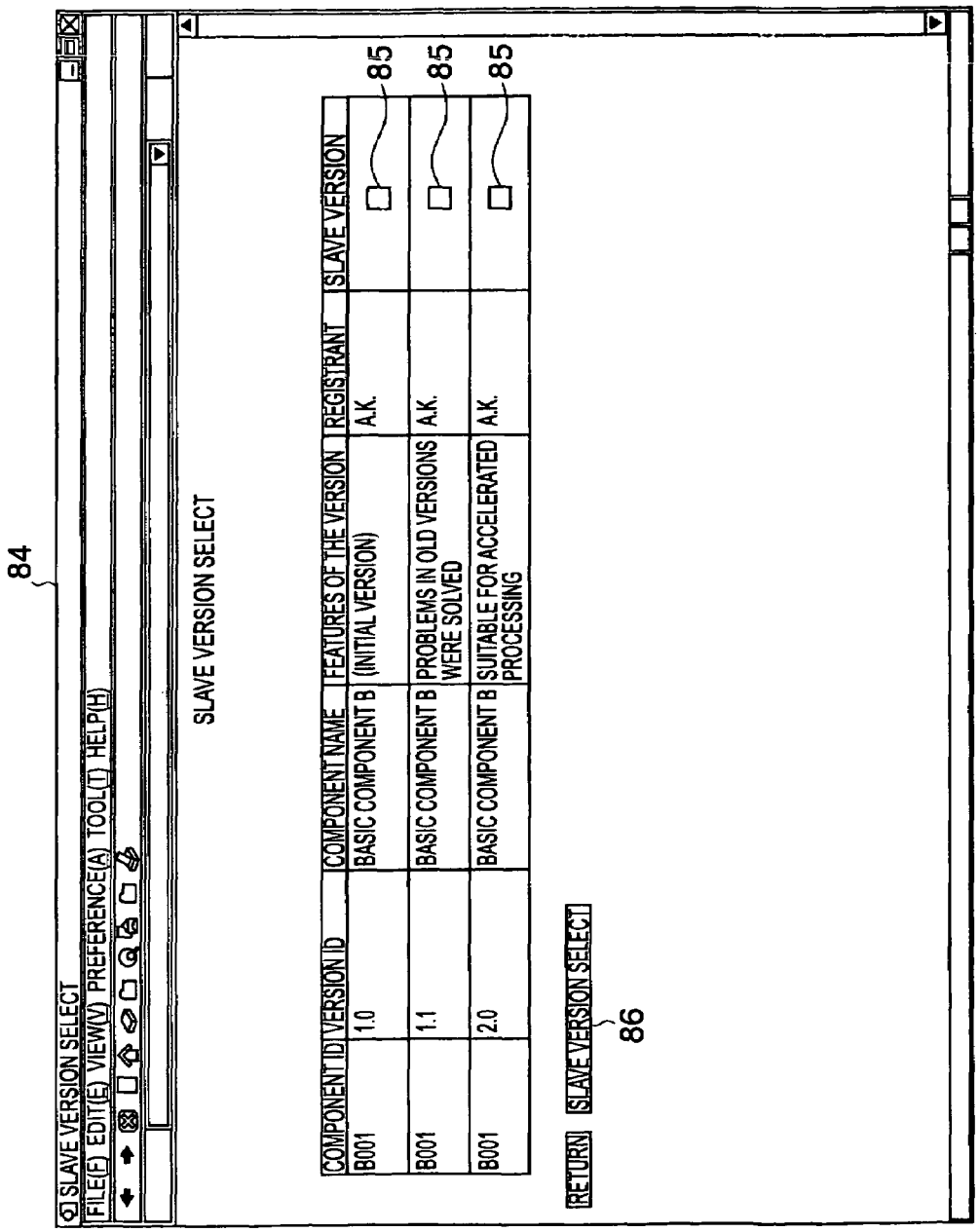
FIG. 41 is a diagram showing a component version select window for the software component (component B001) which is a destination of the slave link.

In the unregistered slave component list 95 shown in FIG. 40, the "correct" button 96 associated with the Ver. 2.0 of the component A001 is selected to produce the inter-component relation edit window 79 in FIG. 13 in relation with the software component, and thereafter, in the inter-component relation edit window 79, selecting the "edit link" button 80 associated with the slave component B001 which the software component uses, the component version select window 84 in FIG. 41 is displayed in relation with the slave component B001.

In the component version select window 84 shown in FIG. 41, checking a blank 85 in the column "slave version" to select the Ver. 2.0 of the component B001 and selecting the "select slave version" button 86, the relation information (slave link) of the software component is registered in the component database 5. Simultaneous with this, the master link corresponding to the registered slave link is automatically created and registered in the component database 5 as the relation information (master link(s)) 9 of the software component. Specifically, the slave link relating the Ver. 2.0 of the component A001 to the cluster of the versions of the component B001 is corrected while the slave link relating the Ver. 2.0 of the component A001 to the Ver. 2.0 of the component B001 is registered, and additionally, the master link relating the Ver. 2.0 of the component B001 to the Ver. 2.0 of the component A001 is automatically registered.

Figures 42, 43, 44:
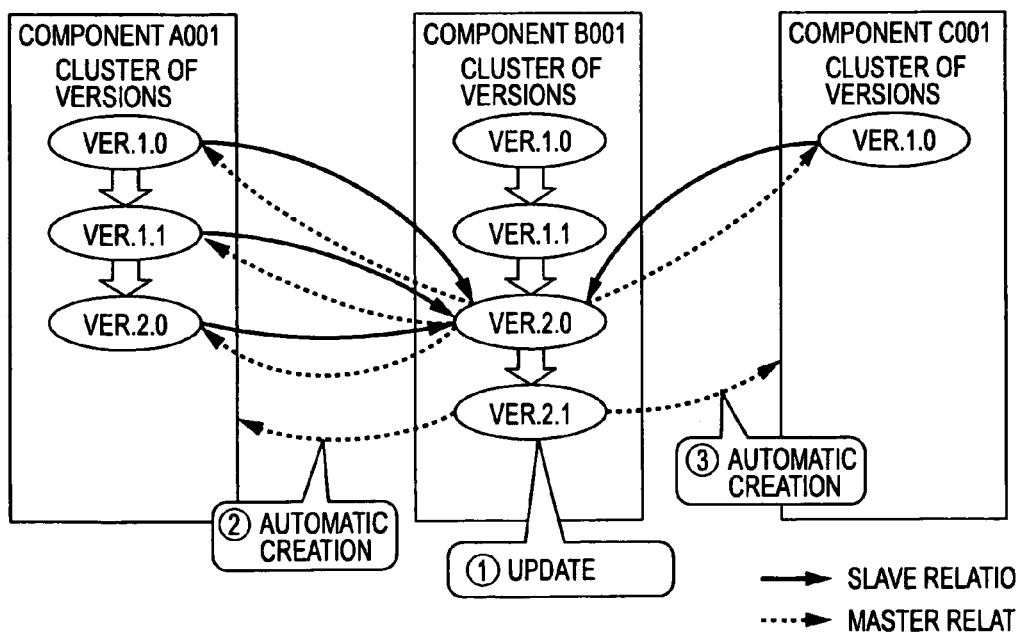
FIG. 42 is a diagram showing a slave link table upon correcting a slave link of the software component (Ver. 2.0 of the component A001)
FIG. 43 is a diagram showing a master link table upon correcting a slave link of the software component (Ver. 2.0 of the component A001)
FIG. 44 is a diagram illustrating a manner of updating the software component (component B001) from Ver. 2.0 to Ver. 2.1.
Figure 47:
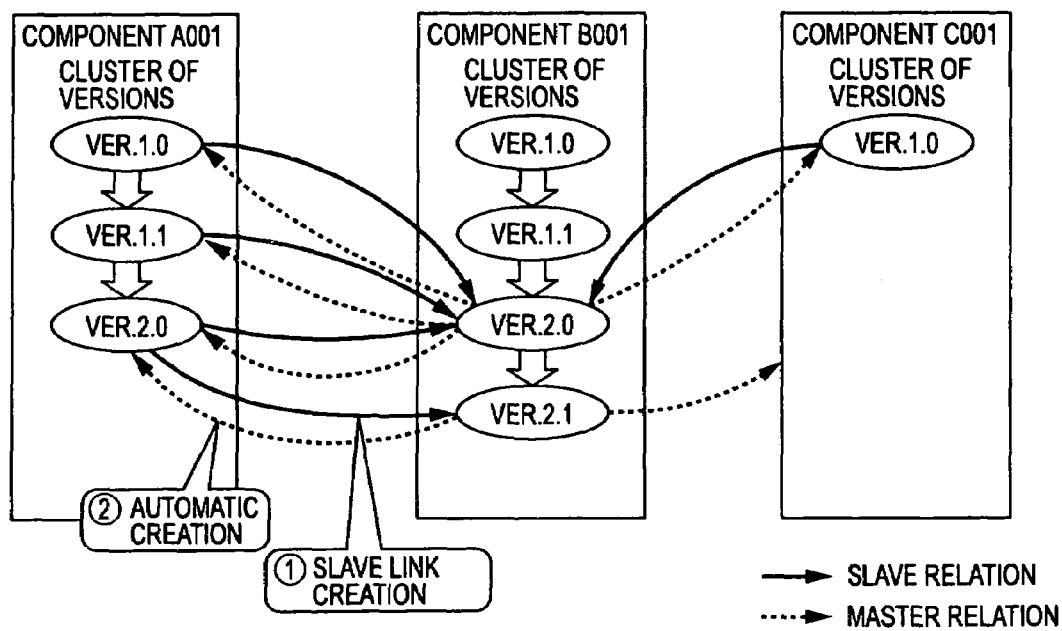
FIG. 47 is a diagram illustrating a manner of creating a slave link relating the software component (Ver. 2.0 of the component A001) to the additional software component (Ver. 2.1 of the component B001)

In this case, the slave link table and the master link table stored in the component database 5 are like those shown in FIGS. 42 and 43.

Exemplary Operation 5

Figure 39:
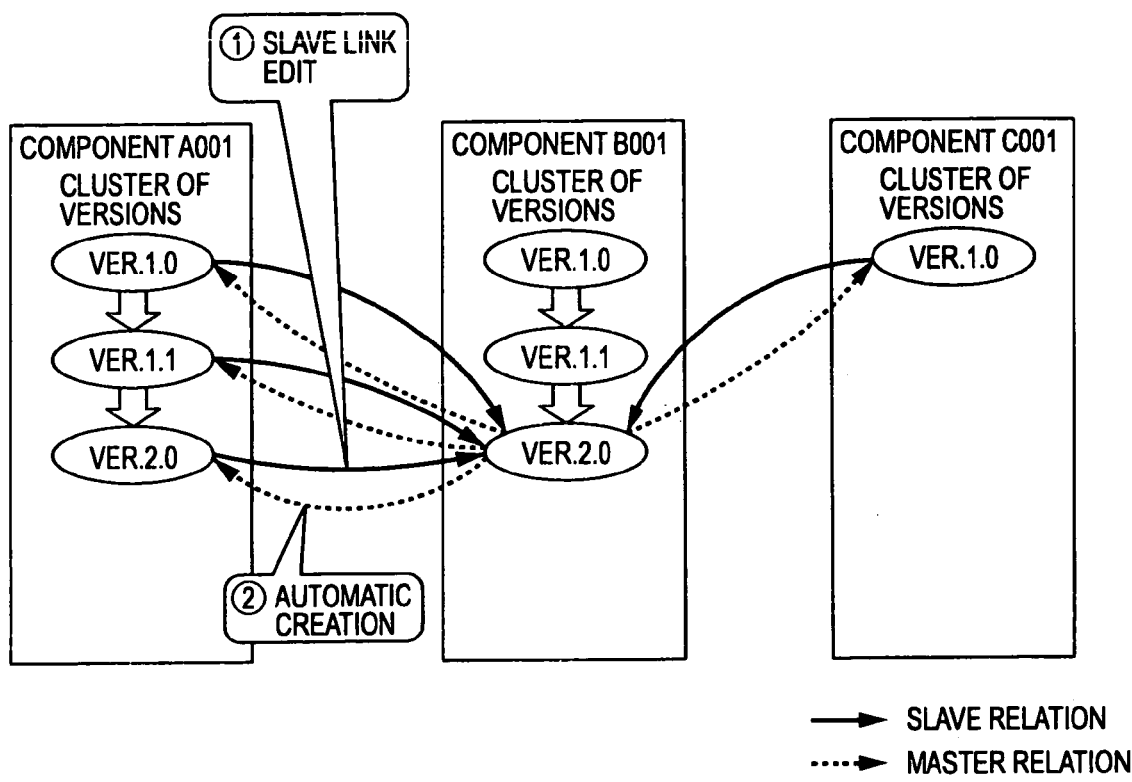
FIG. 39 is a diagram illustrating a manner of correcting (editing) a slave link of a software component (Ver. 2.0 of the component A001)

A fifth exemplary operation will now be described in which the software component B001 updated from the Ver. 2.0 to the Ver. 2.1 is newly registered (see FIG. 44) in the groups of the software components resulted from the Operation 4 (see FIG. 39).

Following a procedure similar to that of the Operation 3, the component B001 is updated from the Ver. 2.0 to the Ver. 2.1. Upon a new registration of the software component in the component database 5 as an updated version, a new master link, which relates to the software component to the cluster of the versions of the master components related to the software components, is automatically created (see FIG. 44) based upon the relation information (master link(s)) corresponding to the previous version of the software component, and consequently, the relation information (master link(s)) of the software component is registered in the component database 5. Specifically, both the master links relating the Ver. 2.1 of the component B001 to the cluster of the versions (with version ID numbered "−1") of the component A001 and relating the Ver. 2.1 of the component B001 to the cluster of the versions (with version ID numbered "−1") of the component C001 are registered.

In this case, the component table and the master link table stored in the component database 5 are like those shown in FIGS. 45 and 46, respectively.

Exemplary Operation 6

A sixth exemplary operation will now be described in which the slave link relating the Ver. 2.0 of the component A001 to the Ver. 2.1 of the component B001 is newly registered (edited) (see FIG. 47) in the groups of the software components resulted from the Operation 5 (see FIG. 44).

Figure 48:
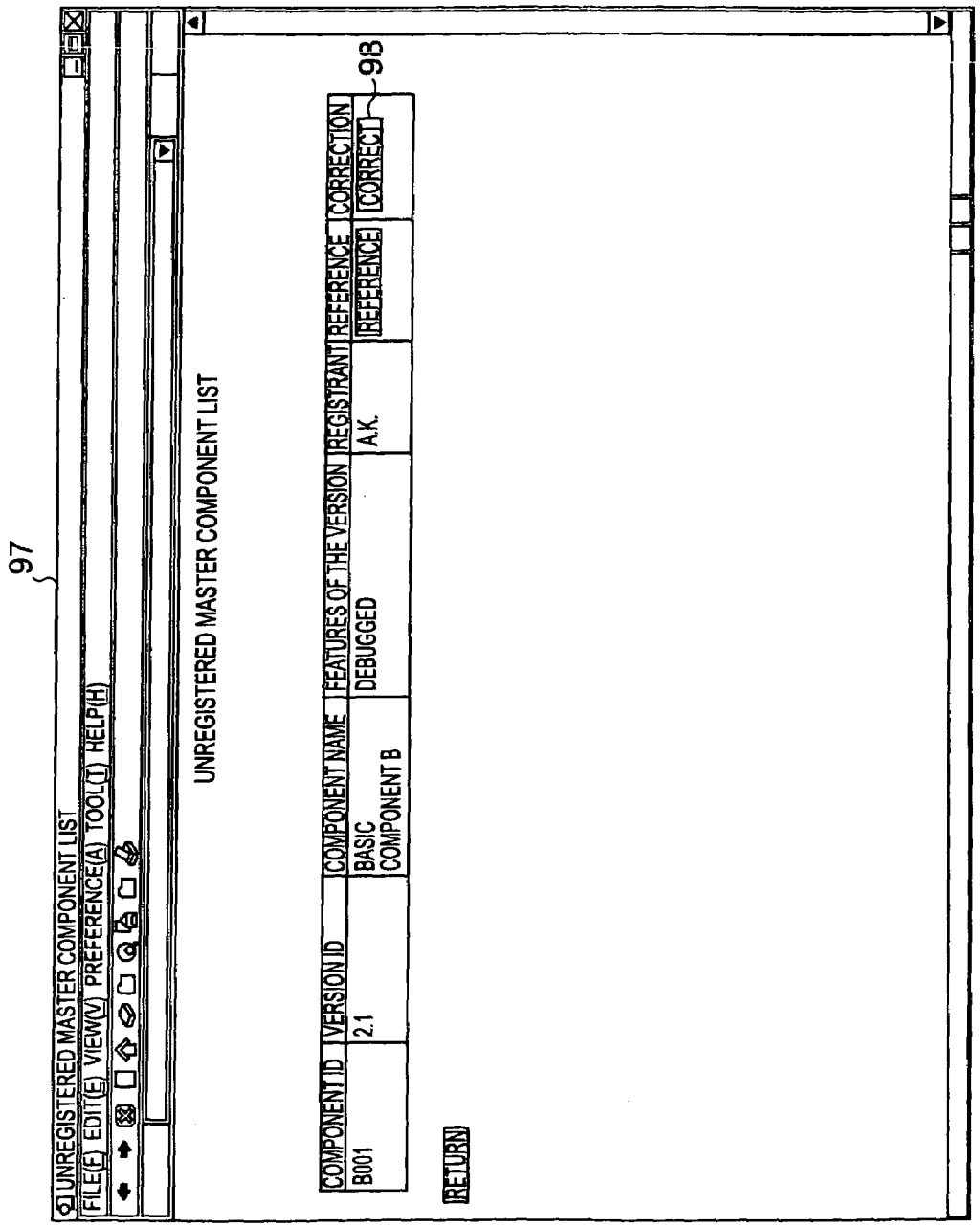
FIG. 48 is a diagram showing an unregistered master component list.

In the component administration menu window 60 shown in FIG. 8, selecting the "slave link/non-confirmed operation list" button 63 causes the unregistered master component list (master link/non-confirmed operation list 97 in FIG. 48 to be put on the display.

Figure 49:
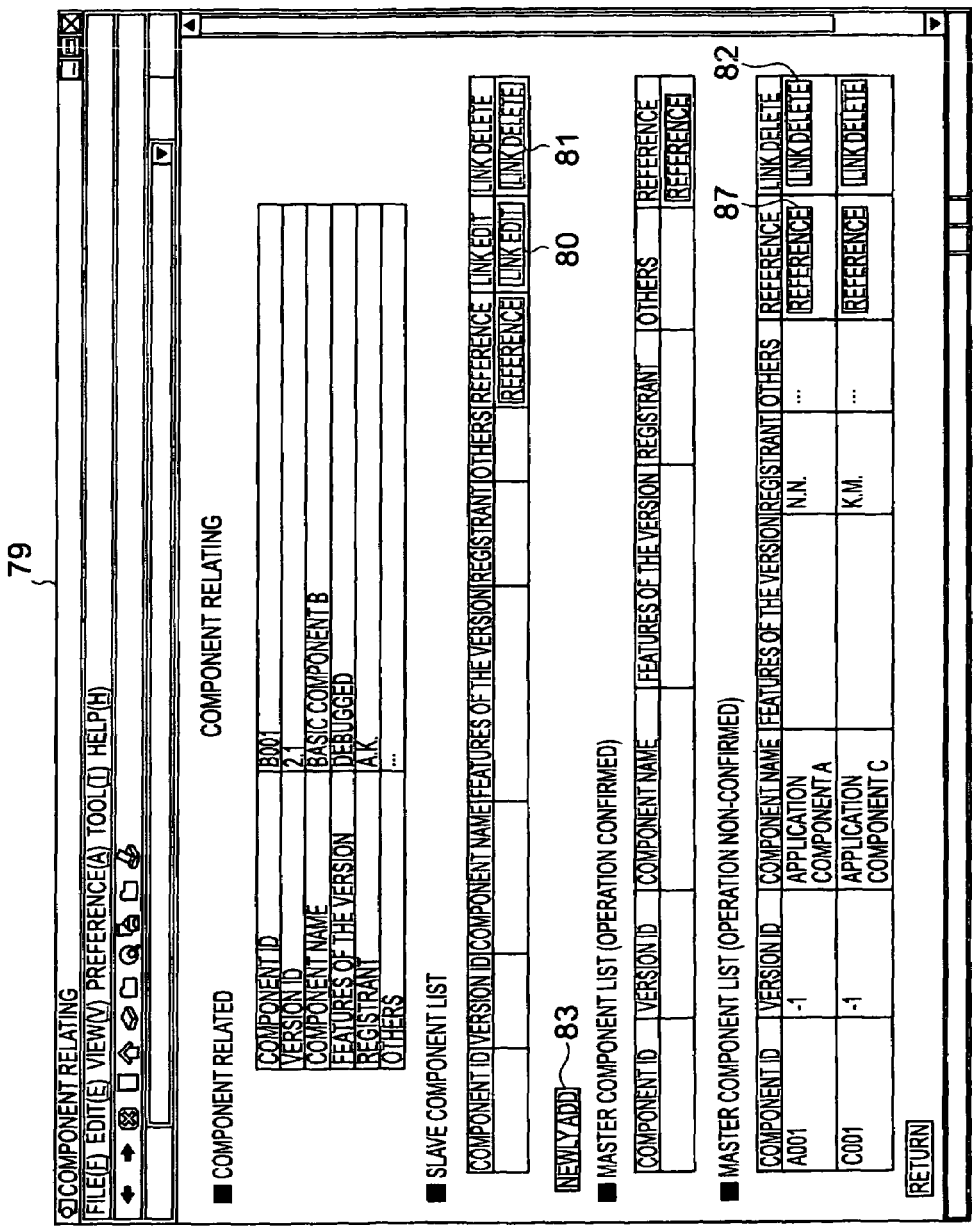
FIG. 49 is a diagram showing an inter-component relation edit window for the software component (Ver. 2.1 of the component B001)

In the unregistered master component list 97 in FIG. 48, selecting the "correct" button 98 associated with the Ver. 2.1 of the component B001 results in the inter-component relation edit window 79 in FIG. 49 being displayed in relation with the software component.

Figure 50:
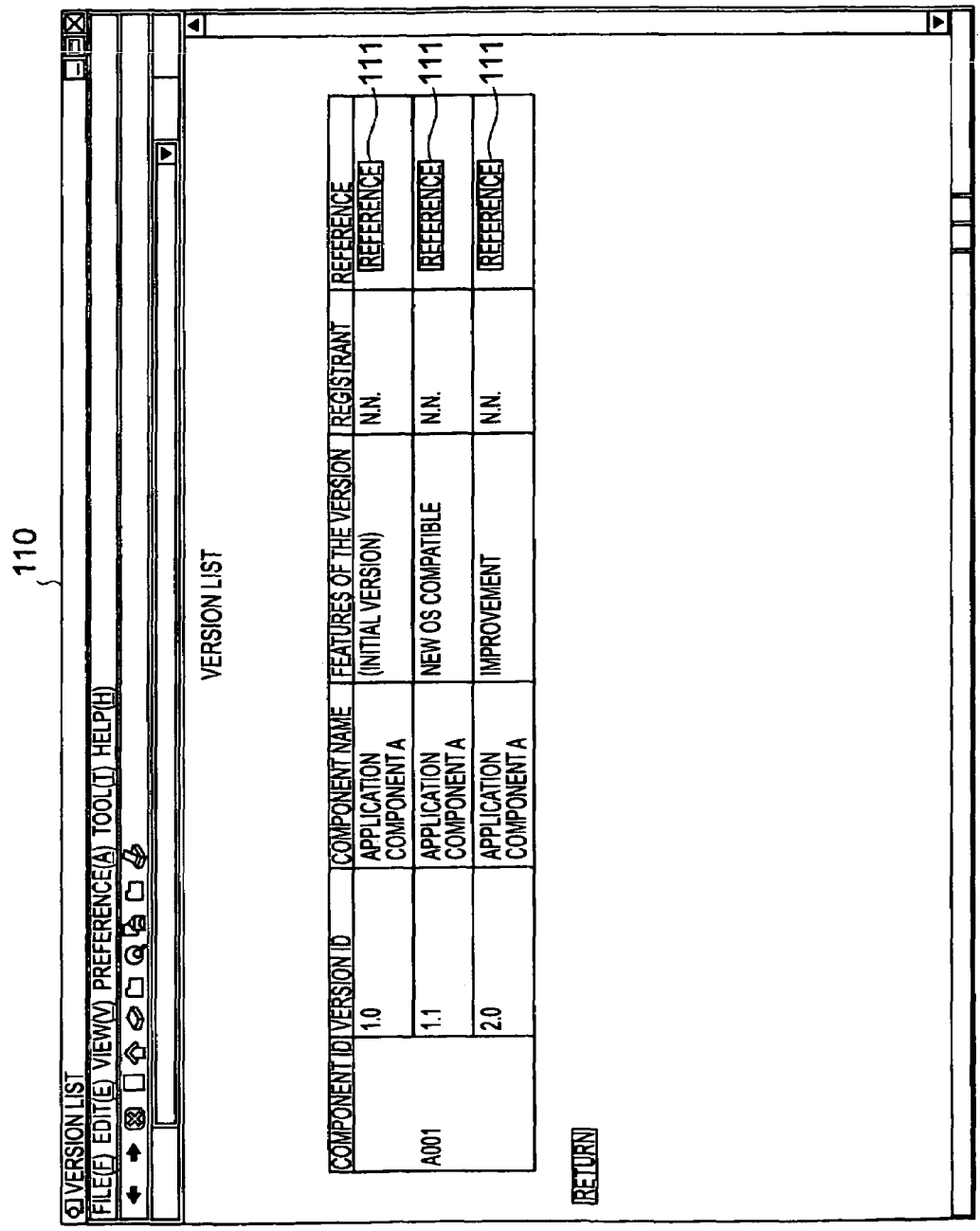
FIG. 50 is a diagram showing a version list for the software component (component A001) which is a destination of a master link of the software component (Ver. 2.1 of the component B001)

In the inter-component relation edit window 79 shown in FIG. 49, selecting a "reference" button 87 associated with the master component A001 by which the software component is used, a version list 110 shown in FIG. 50 is produced on the window in relation with the master component.

Figure 51:
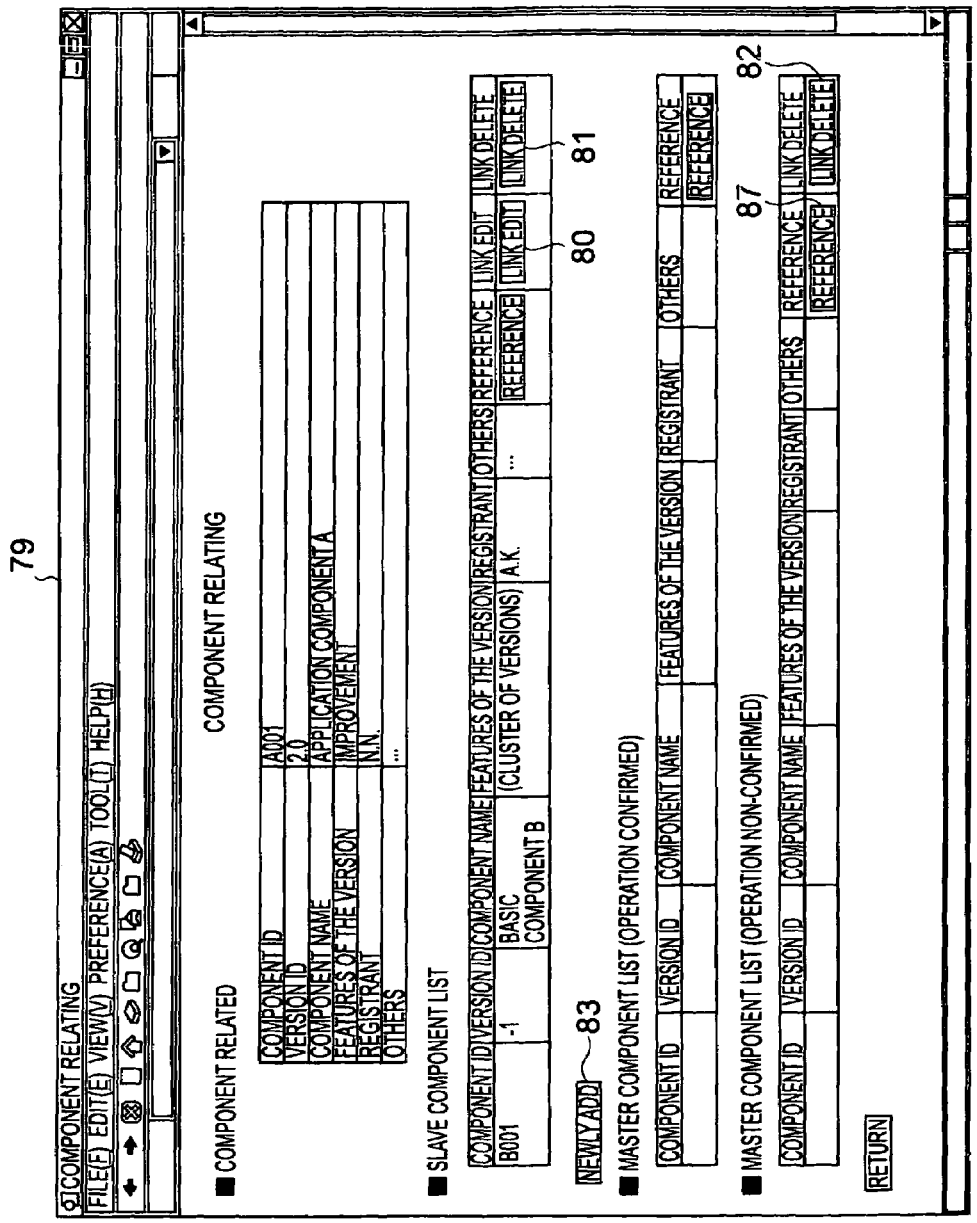
FIG. 51 is a diagram showing an inter-component relation edit window for the software component (Ver. 2.0 of the component A001)

In the version list 110 shown in FIG. 50, a "reference" button 111 associated with the Ver. 2.0 is selected to display the inter-component relation edit window 79 in FIG. 51 in relation with the software component (the Ver. 2.0 of the component A001).

Figure 52:
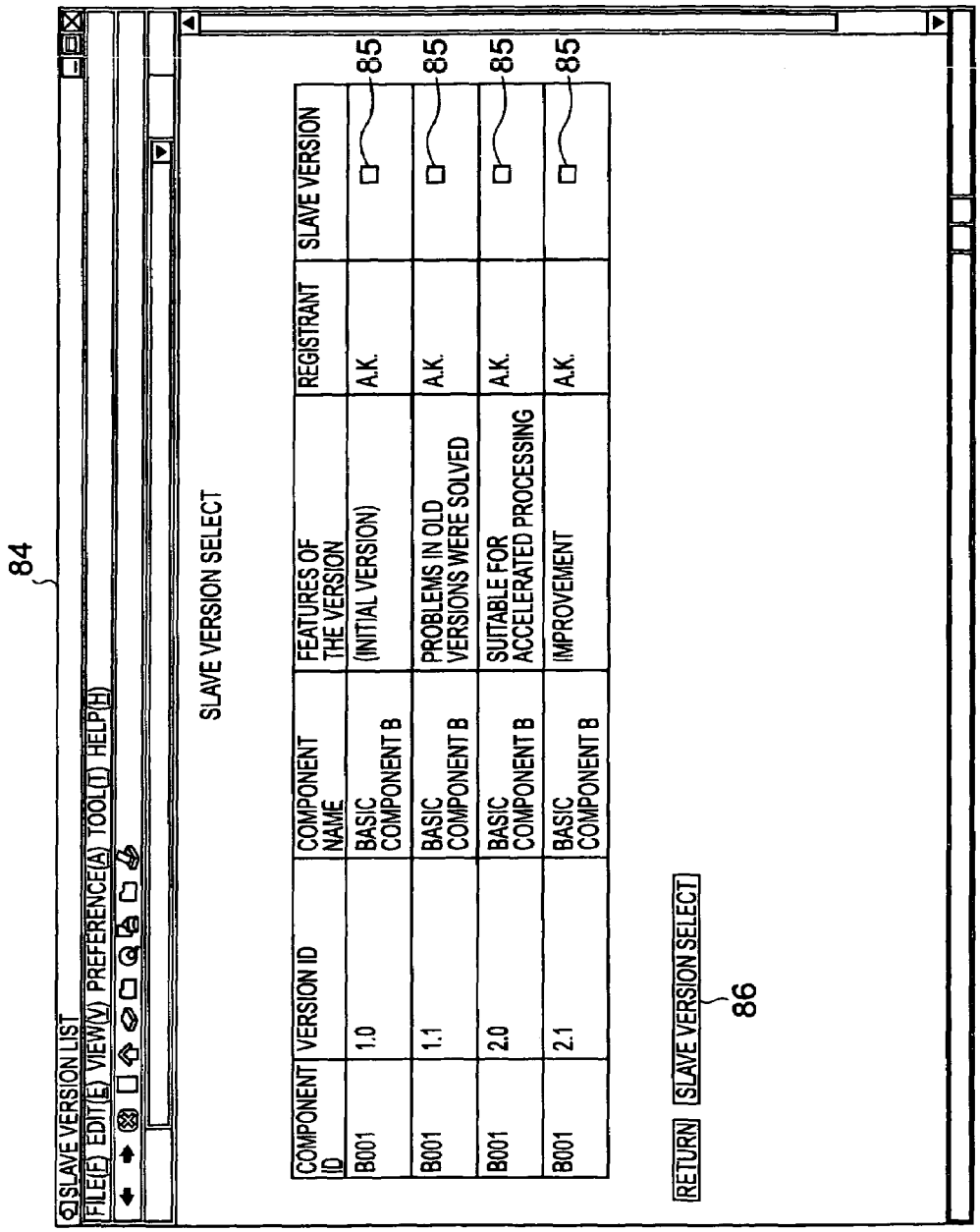
FIG. 52 is a diagram showing a component version select window for the software component (component B001) which is a destination of a slave link.

In the inter-component relation edit window 79 shown in FIG. 51, selecting the "edit link" button 80 associated with the slave component B001 which the software component uses, the component version select window 84 shown in FIG. 52 is displayed in relation with the slave component B001.

In the component version select window 84 shown in FIG. 52, checking a blank 85 in the column "slave version" to select the Ver. 2.1 of the component B001 and selecting the "select slave version" button 86, the relation information (slave link(s)) of the software component is registered in the component database 5. Simultaneously, the master link corresponding to the registered slave link is automatically created and registered in the component database 5 as the reference information (master link) of the software component. Specifically, the slave link relating the Ver. 2.0 of the component A001 to the Ver. 2.1 of the component B001 is registered while the master link relating the Ver. 2.0 of the component B001 to the cluster of the versions of the component A001 is corrected, and moreover, the master link relating the Ver. 2.0 of the component A001 to the Ver. 2.1 of the component B001 is automatically registered.

Figures 53, 54, 55:
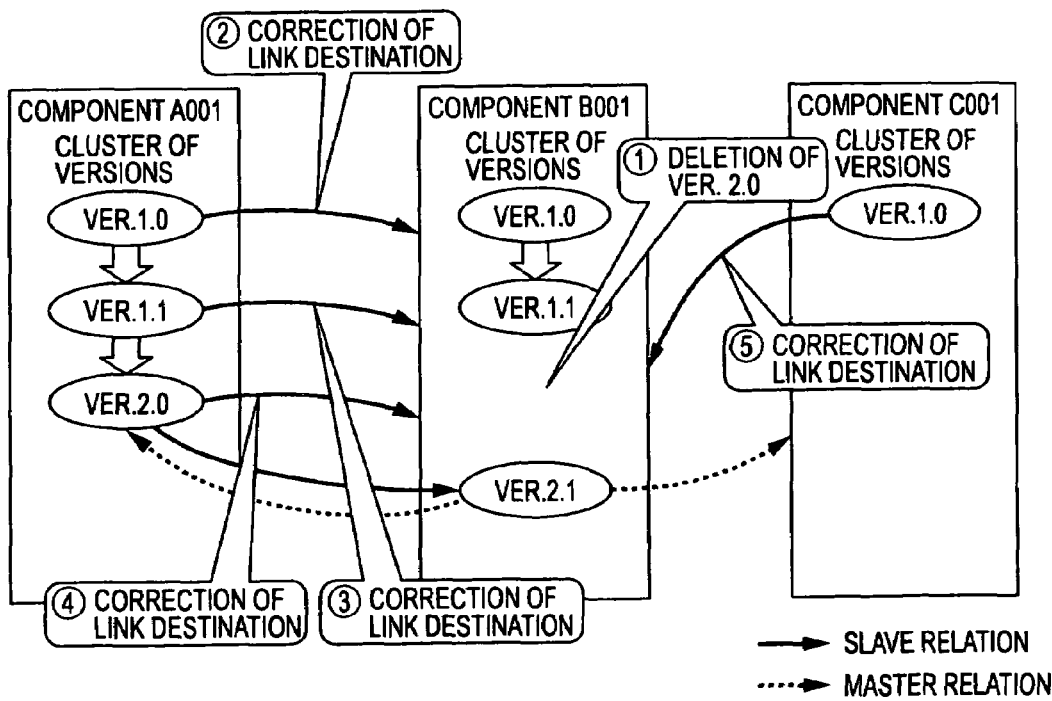
FIG. 53 is a diagram showing a slave link table upon creating a slave link relating the software component (Ver. 2.0 of the component A001) to the additional software component (Ver. 2.1 of the component B001)
FIG. 54 is a diagram showing a master link table upon creating a slave link relating the software component (Ver. 2.0 of the component A001) to the additional software component (Ver. 2.1 of the component B001)
FIG. 55 is a diagram illustrating a manner of deleting the software component (Ver. 2.0 of the component B001)

The slave link table and the master link table stored in the component database 5 are like those shown in FIGS. 53 and 54, respectively.

Exemplary Operation 7

A seventh exemplary operation will now be described in which the Ver. 2.0 of the component B001 is deleted (see FIG. 55).

Figure 56:
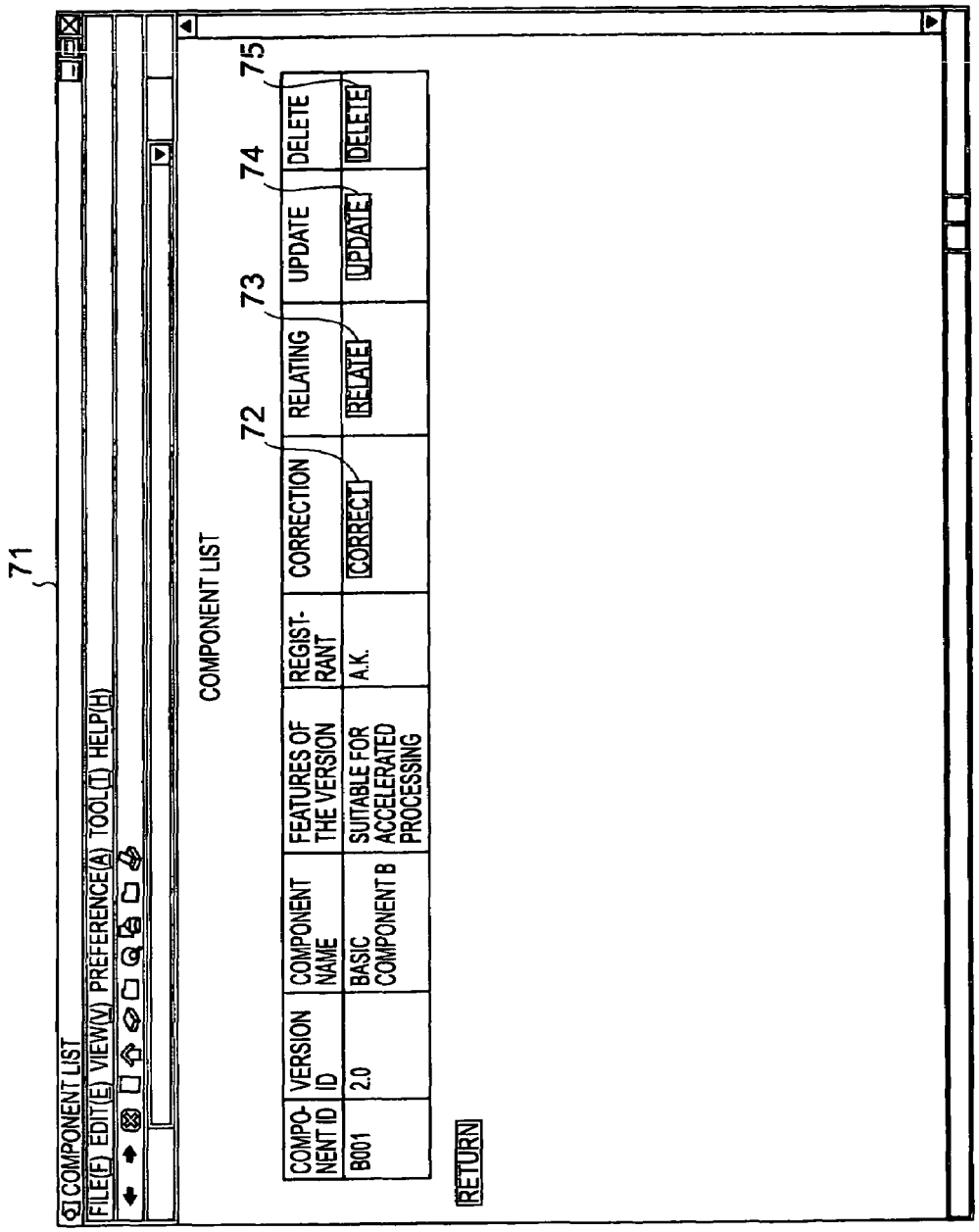
FIG. 56 is a diagram showing a result of retrieving the software component (Ver. 2.0 of the component B001)

In the component administration menu window 60 shown in FIG. 8, selecting the "update/edit relation/delete" button 62 causes the component retrieve window 68 (for administration) shown in FIG. 10 to be displayed. In the component retrieve window 68, after the fields 69 are filled with the retrieve conditions of the software component (component ID, version ID, component name, features of the version, registrant, etc.), selecting the "retrieve" button 75 permits to retrieve from the component database 5 the software component satisfying the retrieval conditions such as component ID (B001) and version ID (2.0). FIG. 56 depicts the component list 71 (for administration) as a result of the retrieval.

Figure 57:
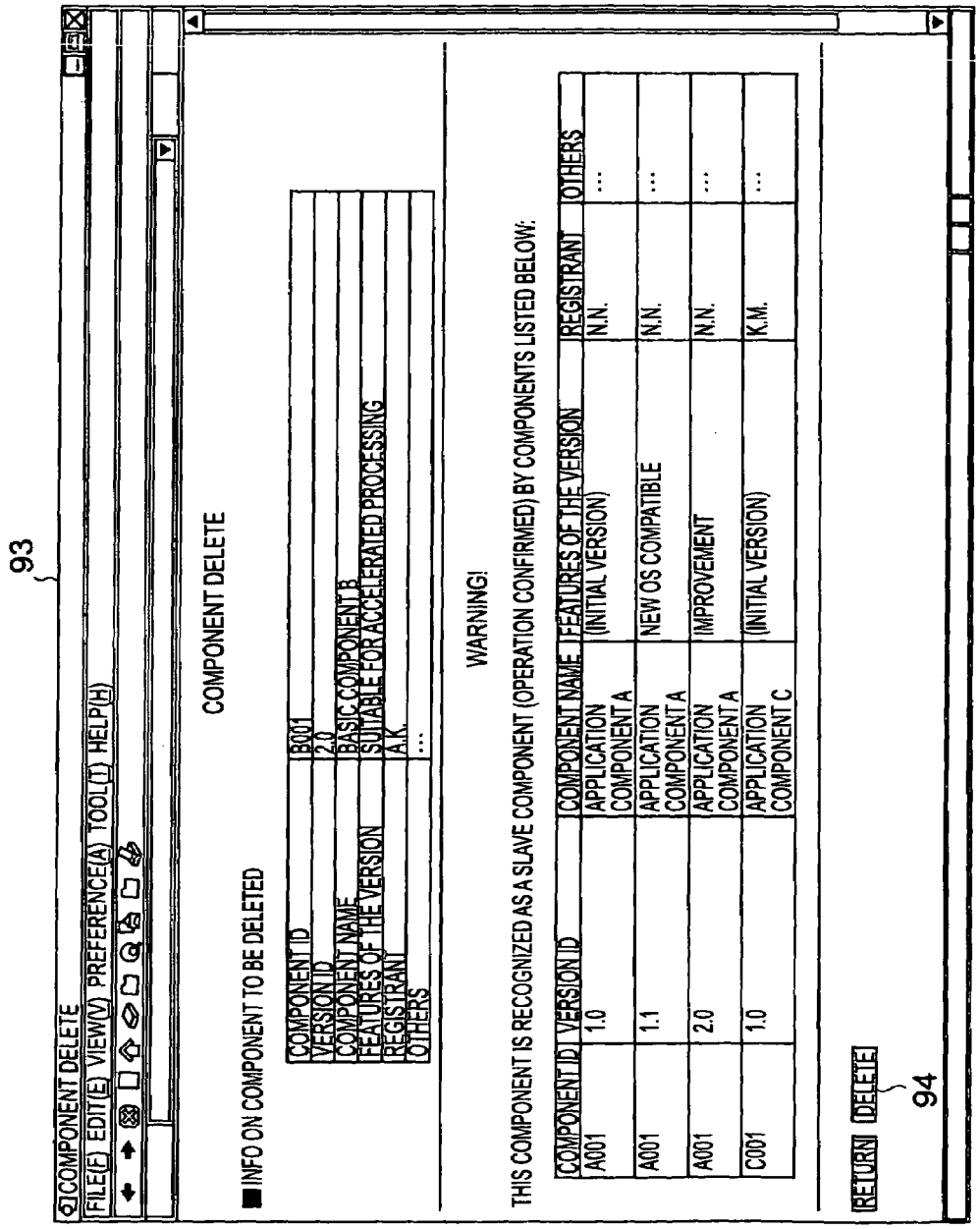
FIG. 57 is a diagram showing a deleted component confirmation window for the software component (Ver. 2.0 of the component B001)

In the component list 71 shown in FIG. 56, the "delete" button 75 is selected to display the component delete window 93 shown in FIG. 57.

In the component delete window 93 shown in FIG. 57, registration information on the software component to delete (the Ver. 2.0 of the component B001) is produced on the display. Simultaneously, a search is made for the presence of the master component(s) by which the software component is used, based upon the relation information (slave link or master link) corresponding to the software component, and if present, they are listed and displayed (as an alert). In the component delete window 93 shown in FIG. 57, selecting the "delete" button 94 causes the software component to be deleted from the component database 5. When there exists a slave link relating to the Ver. 2.0 of the component B001, a destination of the slave link is varied to the cluster of the versions of the component B001. However, if there is no component B001 of any version, the cluster of the versions itself is to be deleted, and the slave link will also be deleted.

In this case, the component table, the slave link table, and the master link table stored in the component database 5 are like those shown in FIGS. 58, 59, and 60, respectively.

In this way, according to the present invention, relation information (slave link(s) and master link(s)), which represents a relation(s) of a software component to another software components, is registered as attribute information of the software components stored in the component database 5, and the relation information thus registered can be used to retrieve and pick up a batch of the software components related to the specific software component. This enables a component utilization user to handle a series of mutually related software components more easily, and this leads to an enhancement of manipulability.

In addition to that, when a slave link is registered in relation with the software components stored in the component database 5, a master link corresponding to the slave link is automatically created and registered, and therefore, a component management user can reduce his or her time and labor spent for registration entry for updated software components.

Furthermore, when it is desired to newly register an updated version of a software component stored in the component database 5, renewed relation information including sub-information that operations among the software components have not been confirmed yet are created and registered based upon relation information on the previous version of the software component. This enables a component utilization user and a component management user to comprehend particulars of each version with respect to complete or incomplete confirmation of the operations among the software components, and this leads to a further enhancement of manipulability. Especially, it results in further enhancement of manipulability for the component utilization user and the component management user to list and display a combination(s) of the software components of which correlated operations have not been confirmed yet.

Also additionally, when it is desired to delete a software component from the component database 5, the presence of a master component using the software component is retrieved and listed on a display (as an alert), based upon relation information on the software component, and hence, it is effectively prevented that a slave component, which a certain software component uses, is inadvertently deleted.

In the above embodiments, when it is desired to newly register an updated version of a software component stored in the component database 5, a renewed relation information, which represents a relation between the software component and a slave component(s) related to the same or a cluster of versions of a master component, is created and registered based upon relation information of the previous version of the software component. Beside to this manner, it may also be possible that the relation information on the software component stored in the component database 5 is under administration along with an operation confirmation information, and in newly registering an updated version of the software component that has already been stored in the component database 5, the relation information on the previous version of the software component is registered along with sub-information that operations among the software components have not been confirmed yet.

Also, in the aforementioned embodiment, the component retrieve/pickup function unit 10 and the component administration/registration function unit 20 of the component management tool 6 provided for the software component library management system can be implemented in forms of programs. Such programs can be recorded in computer readable recording medium such as flexible disc, CD-ROM, and the like, and a similar function may also be implemented in the server computer 3 shown in FIG. 1.

The recording medium suitable for the present invention includes tangible computer-readable storage media such as magnetic disc, internal memory, hard disc, optical disc (CD-R, DVD (Digital Versatile Disk), and the like), optical magnetic disc, semiconductor memory as well as the aforementioned flexible disc and CD-ROM all of which may be of any recording form if they are program-recordable and computer-readable recording medium.

Middleware such as OS (operating system) running on a computer in comply with instructions from programs installed from record medium to the computer, data base management software, network software, and the like may execute part of processes to attain the embodiments intended by the invention.

The recording medium suitable for the present invention is not limited to the medium separate from the computer but may be any recording medium that stores or temporarily stores programs downloaded through LAN and Internet.

More than one recording media may be used, and when a process of the embodiment of the invention is carried out in relation with a plurality of those recording media, they are all included in the invention, and they may be configured in any of the above.

What is claimed is:

1. A software component library management system that manages a software component library having a plurality of software components stored therein, the system comprising:

a component management unit that registers a plurality of relation information items respectively representing a relation of a certain software component to another software component, as attribute information of the software components stored in the software component library, the relation information items including a slave information item specifying a slave component which a certain software component uses, and a master information item specifying a master component by which a certain software component is used;

a component providing unit that provides a batch of software components related to a specific software component, based upon the relation information items registered in the component management unit; and wherein when an updated version of a software component is stored in the software library, the component management unit newly registers the updated version of the software component while creating and registering a renewed relation information item including sub-information that an operation among software components has not been confirmed yet, based upon a relation information item for a previous version of the software component.

2. The software component library management system according to claim 1, wherein the component management unit registers a slave information item for a software component stored in the software component library, while automatically creating and registering a master information item corresponding to the slave information item.

3. The software component library management system according to claim 1, wherein the component management unit manages a cluster of versions which is comprised of a group of different versions of a software component stored in the software component library; and the component management unit newly registers an updated version of a software component stored in the software component library, while creating and registering a renewed relation information item that represents a relation of the software component to a cluster of versions of a related software component serving as either a slave component or a master component, based upon a relation information item for a previous version of the software component.

4. The software component library management system according to claim 1, wherein the component management unit manages a relation information item for a software component stored in the software component library, along with an operation confirmation information item; and the component management unit newly registers an updated version of a software component stored in the software component library, while registering an operation confirmation information item that an operation among software components has not been confirmed yet, along with a relation information item for a previous version of the software component.

5. The software component library management system according to claim 1, wherein the component management unit lists and displays a combination of software components of which mutual operation has not been confirmed yet, based upon the relation information items for the software components stored in the software component library.

6. The software component library management system according to claim 1, wherein the component management unit deletes a specific software component stored in the software component library, while searching for a presence of a master component which uses the specific software component, and giving an alert, if present.

7. A method of managing a software component library having a plurality of software components stored therein, the method comprising the steps of:

registering, by a processor configured to register relation information, a plurality of relation information items that respectively represent a relation of a certain software component to another software component, as attribute information of the software components stored in the software component library, the relation information items including a slave information item specifying a slave component which a certain software component uses, and a master information item specifying a master component by which a certain software component is used;

providing a batch of software components related to a specific software component, based upon the registered relation information items; and when an updated version of a software component is stored in the software component library, newly registering by said processor, the updated version of the software component while creating and registering a renewed relation information item including sub-information that an operation among software components has not been confirmed yet, based upon a relation information item for a previous version of the software component.

8. The method according to claim 7, further comprising the step of registering a slave information item for a software component stored in the software component library, while automatically creating and registering a master information item corresponding to the slave information item.

9. The method according to claim 7, further comprising the step of listing and displaying a combination of software components of which mutual operation has not been confirmed yet, based upon the relation information items for the software components stored in the software component library.

10. The method according to claim 7, further comprising the step of deleting a specific software component stored in the software component library, while searching for a presence of a master component which uses the specific software component, and giving an alert, if present.

11. A tangible computer-readable storage medium having embedded therein instructions, which when executed by a processor, cause the processor to perform a method comprising:

registering a plurality of relation information items that respectively represent a relation of a certain software component to another software component, as attribute information of the software components stored in the software component library, the relation information items including a slave information item specifying a slave component which a certain software component uses, and a master information item specifying a master component by which a certain software component is used;

providing a batch of software components related to a specific software component, based upon the registered relation information items; and when an updated version of a software component is stored in the software component library, newly registering the updated version of the software component, while creating and registering a renewed relation information item including sub-information that an operation among software components has not been confirmed yet, based upon a relation information item for a previous version of the software component.

12. The tangible computer-readable storage medium according to claim 11, wherein the instructions further cause the processor to execute the procedure of registering a slave information item for a software component stored in the software component library, while automatically creating and registering a master information item corresponding to the slave information item.

13. The tangible computer-readable storage medium according to claim 11, wherein the instructions further cause the processor to execute the procedure of listing and displaying a combination of software components of which mutual operation has not been confirmed yet, based upon the relation information items for the software components stored in the software component library.

14. The tangible computer-readable storage medium according to claim 11, wherein the instructions further cause the processor to execute the procedure of deleting a specific software component stored in the software component library, while searching for a presence of a master component which uses the specific is software component, and giving an alert, if present.

* * * * *